(12) United States Patent
Van Hoof et al.

(10) Patent No.: US 11,561,170 B2
(45) Date of Patent: Jan. 24, 2023

(54) METHOD AND SYSTEM FOR PERFORMING TERAHERTZ NEAR-FIELD MEASUREMENTS

(71) Applicant: TECHNISCHE UNIVERSITEIT EINDHOVEN, Eindhoven (NL)

(72) Inventors: Niels Jacobus Johan Van Hoof, Eindhoven (NL); Stan Erik Theodoor Ter Huurne, Tilburg (NL); Henri-Alexei Halpin, Ottawa (CA); Jaime Gómez Rivas, Eindhoven (NL); Arkabrata Bhattacharya, Eindhoven (NL); Georgios Georgiou, Cumnock (GB)

(73) Assignee: TECHNISCHE UNIVERSITEIT EINDHOVEN

( * ) Notice: Subject to any disclaimer, the term of this patent is extended or adjusted under 35 U.S.C. 154(b) by 0 days.

(21) Appl. No.: 17/255,664

(22) PCT Filed: Jun. 28, 2019

(86) PCT No.: PCT/NL2019/050397
§ 371 (c)(1),
(2) Date: Dec. 23, 2020

(87) PCT Pub. No.: WO2020/005065
PCT Pub. Date: Jan. 2, 2020

(65) Prior Publication Data
US 2021/0270733 A1  Sep. 2, 2021

(30) Foreign Application Priority Data
Jun. 28, 2018  (NL) ..................................... 2021205

(51) Int. Cl.
*G01N 21/3586*   (2014.01)
*G01Q 60/22*   (2010.01)

(52) U.S. Cl.
CPC ......... *G01N 21/3586* (2013.01); *G01Q 60/22* (2013.01)

(58) Field of Classification Search
CPC ........... G01N 21/3586; G01N 21/3581; G01Q 60/22; G01J 3/0205; G01J 3/0208
See application file for complete search history.

(56) References Cited

U.S. PATENT DOCUMENTS 6,469,288 B1 * 10/2002 Sasaki .................... G01Q 20/02
250/201.3
2003/0184328 A1   10/2003  Lee et al.

FOREIGN PATENT DOCUMENTS

EP         0426559 A1   5/1991
WO    2010091754 A1   8/2010

OTHER PUBLICATIONS

International Search Report and Written Opinion for corresponding International application No. PCT/NL2019/050397, dated Oct. 10, 2019 (10 pages).

(Continued)

*Primary Examiner* — David P Porta
*Assistant Examiner* — Meenakshi S Sahu
(74) *Attorney, Agent, or Firm* — Mendelsohn Dunleavy, P.C.

(57) ABSTRACT

This disclosure relates to a method for measuring an electric field in the near-field region of an optically excited sample. The method includes optically exciting at least part of the sample. This step includes directing excitation light onto an interface between the sample and a medium. The excitation light is incident onto the interface under an angle of incidence such that total internal reflection of the excitation light occurs at the interface. The method further includes measuring the electric field using a terahertz near-field probe, wherein the terahertz near-field probe is positioned on one side of the interface and the excitation light approaches the (Continued)

interface on another side of the interface. This disclosure further relates to a system and computer program for measuring an electric field in the near-field region of an optically excited sample.

20 Claims, 15 Drawing Sheets

(56) References Cited

OTHER PUBLICATIONS

Eisele, Max, et al. "Ultrafast multi-terahertz nano-spectroscopy with sub-cycle temporal resolution." Nature Photonics 8.11 (2014): 841-845.
Beard, Matthew C., et al. "Terahertz Spectroscopy." Journal Physical Chemistry B 106.29 (2002): 7146-7159.
Pierdnoir, A., et al. "First Specifications of a PSTM Working In the Infrared." Near Field Optics, NATO ASI Series (Series E: Applied Sciences), Kluwer Academic Publishers, vol. 242 (1993): 309-316.

* cited by examiner

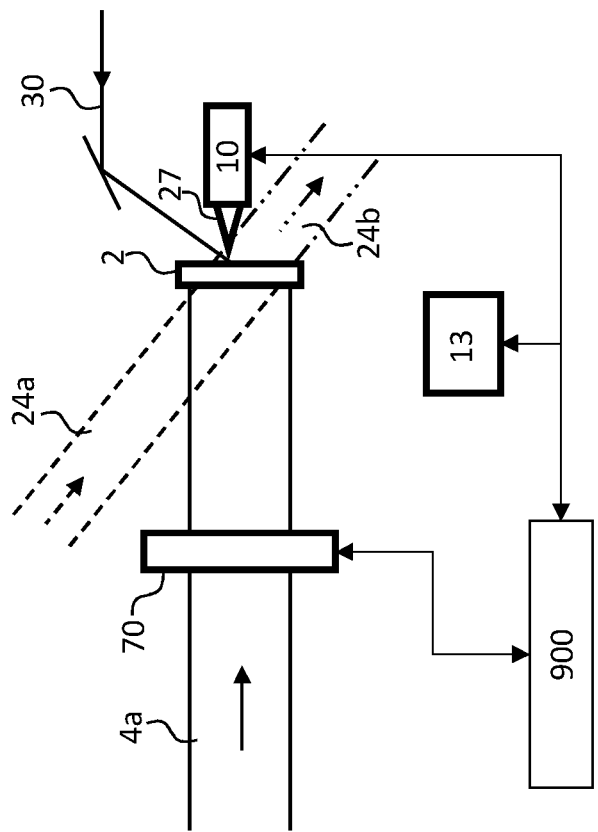
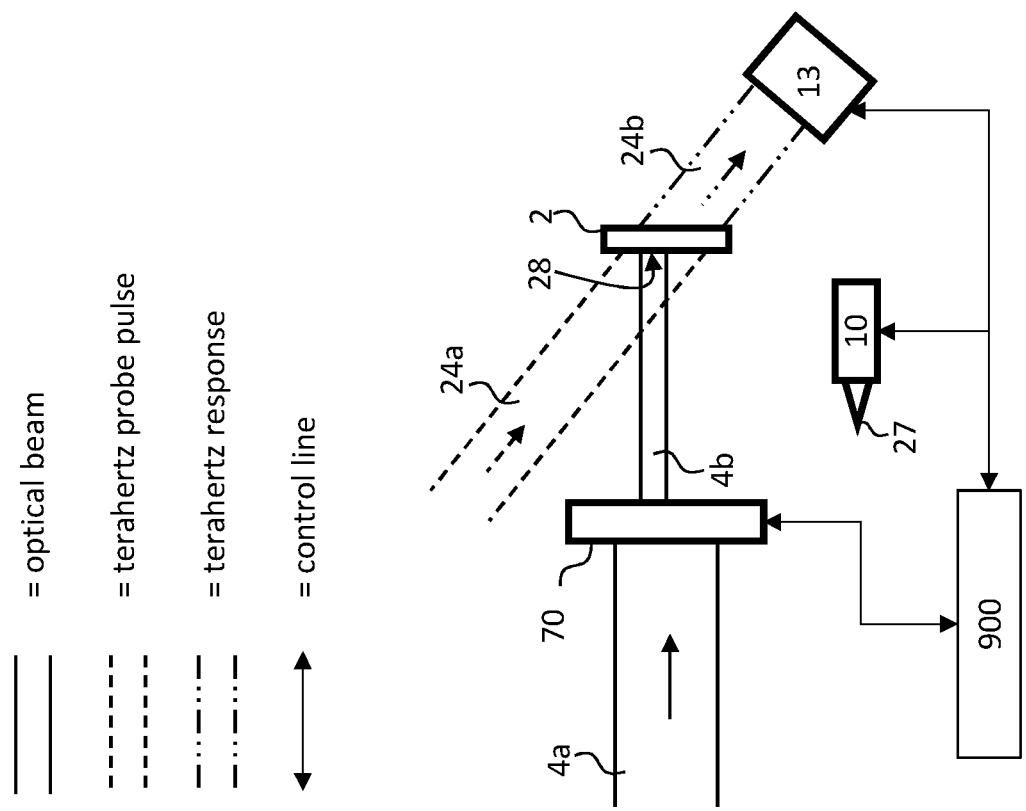
FIG. 11B
FIG. 11A

| Area | Position | FF response |
|---|---|---|
| 28a | (2;5) | 0.6 |
| 28b | (3;5) | 0.6 |
| 28c | (4;5) | 0.5 |
| 28d | (5;5) | 0.4 |
| 28e | (2;4) | 0.5 |
| 28f | (3;4) | 0.5 |
| 28g | (4;4) | 0.4 |
| 28h | (5;4) | 0.5 |
| 28i | (2;3) | 0.5 |
| 28j | (3;3) | 0.4 |
| 28k | (4;3) | 0.4 |
| 28l | (5;3) | 0.1 |
| 28m | (2;2) | 0.4 |
| 28n | (3;2) | 0.5 |
| 28o | (4;2) | 0.5 |
| 28p | (5;2) | 0.4 |

METHOD AND SYSTEM FOR PERFORMING TERAHERTZ NEAR-FIELD MEASUREMENTS

FIELD OF THE INVENTION

This disclosure relates to a method, system and computer program for performing terahertz near-field measurements, in particular a terahertz near-field measurement on an optically excited sample.

BACKGROUND

Terahertz (THz) spectroscopy has become a widely adopted experimental technique for the investigation of material properties. However, while THz spectroscopy has shown to be a powerful tool for characterizing materials, the use of THz radiation presents an important challenge, namely the diffraction limit: the smallest possible spot size achievable using conventional optics leads to beam waist diameter on the order of mm's for the longest wavelengths employed in typical THz spectroscopy experiments. In the case of photoexcited samples, this diffraction limits THz spectroscopy to both large homogeneous samples and wide-area excitation beams. The sample should be large and homogeneous so that effects of inhomogeneities are minimized. Further, a wide-field photoexcitation beam should be used to ensure homogeneous illumination across the probed sample area. Unfortunately, preparing large homogeneous samples is not always possible and only certain amplified laser sources can supply the fluence that is required for exciting large areas.

*Ultrafast multi-terahertz nano-spectroscopy with sub-cycle temporal resolution* by Eisele et al (Nature Photonics, Volume 8, pages 841-845 (2014)) discloses a near-field microscopy method wherein laser pulses are used to pump a sample and terahertz pulses are focused onto a sharp metallic tip of a scattering type near-field scanning optical microscope (s-NSOM), which tip is operated in tapping mode. In this method, the tip acts like an ultrabroadband antenna that strongly confines electromagnetic radiation in the near-field of the tip. The tip-sample polarization response leads to a scattered electromagnetic pulse carrying information about the dielectric function of the sample with 10 nm spatial resolution. The scattered field is subsequently detected electro-optically.

An important disadvantage of this method is that terahertz background radiation reflected directly from the sample without having reached the tip, to some extent, distort the measurement of the scattered electromagnetic pulse that does originate from the tip. The background radiation lowers the signal-to-noise ratio as measured by the electro-optical detector.

SUMMARY

Hence, there is a need in the art for an improved method for performing terahertz near-field microscopy. Therefore, in one aspect, this disclosure relates to a method for measuring an electric field in the near-field region of an optically excited sample. The method comprises optically exciting at least part of the sample. This step comprises directing excitation light onto an interface between the sample and a medium. The excitation light is incident onto said interface under an angle of incidence such that total internal reflection of the excitation light occurs at the interface. The method further comprises measuring said electric field using a terahertz near-field probe, wherein the terahertz near-field probe is positioned on one side of said interface and the excitation light approaches the interface on another side of said interface.

One aspect of this disclosure relates to a system for measuring an electric field in the near-field region of an optically excited sample, such as a terahertz near-field microscope system. The system comprises an optical system for directing excitation light onto an interface between the sample and a medium under an angle of incidence such that total internal reflection of the excitation light occurs. The system further comprises a terahertz near-field probe for measuring said electric field in the near-field region of the sample. The terahertz near-field probe is positioned on one side of said interface and the optical system is configured such that the excitation light approaches the interface on another side of said interface.

Advantageously, the electric field is measured in the near-field region of the optically excited sample. Hence, background radiation from the sample will to a lesser extent distort the measurement. Further, since the excitation light does not pass the interface, the excitation light will not reach the probe. Hence, interaction between the excitation light and the terahertz near-field probe, which may also distort measurements or may even permanently damage the terahertz near-field probe, is reduced.

The near-field region of a sample may relate to the region within a wavelength of the sample, e.g. a wavelength of a terahertz electromagnetic wave.

The electric field may be caused by electromagnetic radiation from the sample. The electromagnetic radiation from the sample may comprise terahertz radiation, for example associated with a terahertz probe pulse that has interacted with the optically excited sample. Terahertz radiation may be understood to relate to electromagnetic radiation having a frequency between 0.1 and 10 THz, preferably between 0.3 THz and 3 THz. Additionally or alternatively, the electromagnetic radiation from the sample may comprise radiation caused by photoluminescence of the sample.

For total internal reflection of the optical excitation of the sample to occur at an interface between two media, in principle, light should approach the interface from the optically denser medium. Exceptions to this principle may occur when one of the media is a thin film.

The interface may be understood to be a surface forming a common boundary between the sample and the medium. The angle of incidence may be understood to be the angle which the incident excitation light makes with a perpendicular to the interface at the point of incidence. The interface may be associated with a critical angle of incidence for total internal reflection and the angle of incidence may be larger than said critical angle of incidence. The excitation light may comprise a collimated light beam, such as a laser beam.

Preferably, the terahertz near-field probe is at least partially positioned in the near-field region of the optically excited sample. In particular, the terahertz near-field probe may comprise a tip and may be configured to measure the electric field at the position of the tip. The tip may be positioned in the near-field region of the sample.

The terahertz near-field probe may be configured to measure electromagnetic radiation that is associated with, for example comes from, an area of interest on the sample. The area of interest may have a dimension between 10 and 1000 micrometers, preferably between 10 and 100 micrometers. Advantageously, such an area of interest is larger than the area of interest that a typical s-NSOM tip can investigate, which enables to scan faster over the sample. Additionally the probe does not rely on near-field enhancement, and thus does not influence the THz response of the sample.

In one embodiment, optically exciting at least part of the sample comprises directing the excitation light through the medium onto said interface. This embodiment is useful for exciting very thin samples. In this embodiment, the excitation light travels through the medium before being incident onto the interface. The excitation light does not propagate through the sample in this embodiment. The terahertz near-field probe is positioned on one side of the sample and said interface on another side of the sample.

This embodiment makes use of attenuated total reflection (ATR), which may be understood to be a species of total internal reflection (TIR). An evanescent wave is formed that partially extends into the sample and is at least partially absorbed by the sample. Herewith the sample is optically excited.

In one embodiment, optically exciting at least part of the sample comprises directing the excitation light through the sample onto said interface. Preferably, the sample is associated with a first refractive index and the medium is associated with a second refractive index lower than the first refractive index. In an example, said medium is air.

In one embodiment, the terahertz near-field probe comprises a photoconductive terahertz near-field probe. This embodiment further comprises directing an optical probe pulse onto the terahertz near-field probe for measuring the electric field.

Conveniently, since the photoconductive terahertz near-field probe is positioned on another side of the interface than the excitation light that is reflected off the interface due to total internal reflection, the photoconductive probe is not influenced by excitation light reaching the photoconductive probe.

The optical excitation light can namely excite the probe located close to the sample surface directly and/or through reflection for front-excitation or through transmission for back-excitation. This excitation may alter the response of the probe to THz radiation by introducing additional charge carriers or even damage it. Increasing the distance of the probe to the sample could reduce this problem. However, this will lead to a loss of spatial resolution and near-field intensity. This embodiment thus enables to prevent alteration of the terahertz near-field probe's response without having to decrease the spatial resolution of the measurements.

The photoconductive probe may comprise a tip, e.g. a microprobe tip, and may be configured to measure the electric field at the position of the tip upon reception of an optical probe pulse. Examples of a photoconductive probe that may be used in the methods and systems described herein are described in WO2010/091754 A1.

The technology described herein conveniently enables to use light of the same wavelength for both the excitation light and the optical probe pulse. After all, the excitation light does not reach the probe, because the excitation light is totally reflected by the interface. Therefore, the excitation light can be light to which the photoconductive terahertz near-field probe is susceptible.

In one embodiment, the method comprises directing an electromagnetic terahertz probe pulse onto the optically excited sample. The terahertz probe pulse transmits through and/or reflects from the optically excited sample. In this embodiment, the electric field that is measured by the terahertz near-field probe is at least partially caused by the transmitted and/or reflected terahertz probe pulse.

Additionally, the measured signal or intensity may be partially caused by photoluminescence of the sample. This embodiment enables to simultaneously measure the photoluminescence caused by the optical excitation as well as the terahertz response of an optically excited sample as will be explained below. The applicants have found that a photoconductive terahertz near-field probe can also be used to detect photoluminescence.

The terahertz probe pulse interacts with the optically excited sample, in particular with optical excitations in the sample, for example in the sense that the optical excitations, such as free carriers, distort the terahertz probe pulse.

The measured electric field being at least partially caused by the transmitted and/or reflected terahertz probe pulse may require that the terahertz near-field probe measures the electric field at the moment that at least part of the pulse passes the terahertz near-field probe, e.g. passes a tip of the terahertz near-field probe.

In one embodiment, the method comprises directing a second electromagnetic terahertz probe pulse onto the sample when the sample is not optically excited, the second terahertz probe pulse transmitting through and/or reflecting from the sample. This embodiment further comprises measuring a reference electric field caused by the second terahertz probe pulse that has reflected from and/or transmitted through the sample.

This embodiment enables to measure a reference electric field based on which the effect of optical excitations in the sample on the terahertz probe pulse can be accurately investigated. Preferably, the reference electric field and the electric field that is measured when the sample is optically excited, are measured at the same position.

In one embodiment, directing the excitation light onto said interface comprises directing the excitation light onto a surface of an optical device, such as a prism, for example a Dove prism, wherein the surface is oriented at an angle with respect to said interface such that at the surface the excitation light refracts towards said interface.

In one embodiment, the optical system comprises an optical device, such as a prism, e.g. a Dove prism, comprising a surface that is oriented at an angle with respect to said interface for refracting excitation light that is incident on the surface towards said interface. The surface being oriented at an angle with respect to the interface enables in a convenient manner a large angle of incidence of the excitation light onto the interface with is sufficiently large for total internal reflection to occur.

In one embodiment, the system for measuring an electric field in the near-field region of an optically excited sample comprises at least one of
- a light source system, such as a laser, for generating the excitation light and/or an optical probe pulse and/or light based on which a terahertz emitter emits a terahertz probe pulse;
- a terahertz emitter for generating a terahertz probe pulse;
- a first optical delay line for timing the excitation light optically exciting the sample with respect to a terahertz probe pulse being incident on the sample;
- a second optical delay line for timing an optical probe pulse being incident on the near-field terahertz probe with respect to the terahertz probe pulse being incident on the sample;
- an optical chopper for modulating the excitation light;
- a photodetector for measuring an intensity of excitation light having optically excited the sample;

a demodulation system, such as a lock-in amplifier, for demodulating a signal as output by the near-field terahertz probe;

a data processing system for storing and/or processing one or more demodulated signals;

a data processing system configured as a control system for controlling at least one of the light source system, the first optical delay line, the second optical delay line, the terahertz emitter, the photodetector and the demodulation system.

In one embodiment, directing the electromagnetic terahertz probe pulse onto the optically excited sample comprises directing the terahertz probe pulse onto a surface of the optical device, which surface is substantially perpendicular to the direction of propagation of the terahertz probe pulse. The perpendicular surface ensures that the terahertz probe pulse is minimally distorted when the terahertz probe pulse enters the optical device.

In one embodiment, the method comprises measuring a signal proportional to the photoluminescence intensity of an at least partially excited sample using the same terahertz near-field probe used to measure said electric field, wherein the terahertz near-field probe is positioned on one side of said interface and the excitation light approaches the interface on another side of said interface.

In one embodiment, the method comprises optically exciting at least part of the sample comprising directing further excitation light, such as a second optical excitation pulse, onto the interface for causing photoluminescence of the sample. The further excitation light is incident onto said interface under an angle of incidence such that total internal reflection of the further excitation light occurs at the interface. This embodiment further comprises, without directing a terahertz probe pulse onto the sample, measuring an intensity of said photoluminescence using the terahertz near-field probe, for example by measuring the radiant flux received by the terahertz near-field probe. The terahertz near-field probe is positioned on one side of said interface and the further excitation light approaches the interface on another side of said interface. This embodiment enables to separately detect photoluminescence caused by the excitation light.

In one embodiment, the method comprises applying a first periodic signal comprising terahertz probe pulses to the sample comprising repeatedly directing respective terahertz probe pulses onto the sample. The first periodic signal has a first frequency. The respective terahertz probe pulses may be understood to form the applied first signal. This embodiment further comprises applying a second periodic signal comprising optical excitation pulses to the sample comprising repeatedly directing respective optical excitation pulses onto the sample. The second periodic signal has a second frequency that differs from the first frequency. This embodiment also comprises repeatedly measuring respective values of the electric field in the near-field region of the sample using the terahertz near-field probe, which may comprise repeatedly directing an optical probe pulse onto the near-field detector. The measured values form an output signal. Preferably, the electric field is measured at a fixed position. The first and second signal are applied simultaneously. This embodiment further comprises demodulating the output signal using a first reference signal having the first frequency for obtaining a first demodulated output signal and demodulating the output signal using a second reference signal having the second frequency for obtaining a second demodulated output signal. The embodiment also comprises processing the first and second demodulated output signal for obtaining at least one of (i) a value indicative of the intensity of photoluminescence of the sample, and (ii) a value indicative of the electric field that is caused by a terahertz probe pulse that has been reflected by or transmitted through the optically excited sample, and (iii) a value indicative of the electric field that is caused by a terahertz probe pulse that has been reflected by or transmitted through the sample while not being optically excited. This embodiment enables to improve the signal-to-noise ratio of the measurements using lock-in detection. Low frequency noise can be eliminated effectively with such detection.

Demodulating the output signal using a reference signal may comprise multiplying the output signal with the reference signal. Demodulating may further comprise, after said multiplication, applying a low-pass filter, for example in order to obtain a DC component in the signal resulting from said multiplication.

In one embodiment, the method comprises demodulating the output signal using a third reference signal having the first or second frequency, wherein the third reference signal is phase-shifted with respect to the first or second reference signal respectively for obtaining a third demodulated output signal. This embodiment further comprises processing the first, second and third demodulated output signal for obtaining at least one of the values (i), (ii) and (iii) mentioned above. This embodiment enables to extract all three values (i), (ii) and (iii) from the signal as output by the single terahertz near-field probe.

In one embodiment, processing the demodulated output signals comprises, for each demodulated output signal, based on the first and second periodic signals applied to the sample, determining contributions to the demodulated output signal by photoluminescence of the sample, by one or more terahertz probe pulses that have been reflected by or transmitted through the optically excited sample and by one or more terahertz probe pulses that have been reflected by or transmitted through the sample that is not optically excited. This embodiment further comprises, based on the demodulated output signals and based on the determined contributions, determining at least one of the values (i), (ii) and (iii) mentioned above.

The output signal is also periodic because both the first and second signals applied to the sample are periodic. Because the first and second signal are known, it is possible to determine for a complete period of the output signal the relative contributions to the output signal by the mentioned phenomena.

To exemplify, one period of the output signal consists of four values as output by the terahertz near-field probe at four respective time instances, t0, t1, t2, t3. The first periodic signal applied to the sample consists of two terahertz probe pulses one of which is directed to the sample at t0 and the other at t2. The second periodic signal consists of two optical excitation pulses, one at (or a few picoseconds before) t0 and another at (or a few picoseconds before) t1. Then, it can be determined that the value as output by the terahertz near-field probe at t0 consists of a contribution by photoluminescence of the sample (x_PL) and by a terahertz probe pulse that has been transmitted through the optically excited sample (x_THz). Further, that the value as output at t1 consists of a contribution by photoluminescence of the sample (x_PL). Further that the value as output at t3 consists of a contribution by a terahertz probe pulse that has been transmitted through the sample that is not optically excited (x_REF). Further, that the output signal at t3 should be zero. Thus, the demodulated first, second and third output signals, which typically are three respective constant values, can be expressed in terms of x_PL, x_THz and x_REF. These expressions can be solved for x_PL, x_THz and x_REF as will be explained in more detail below.

One aspect of this disclosure relates to a method for applying a first and second period signal to a sample as described herein.

One aspect of this disclosure relates to a method for processing an output signal of a terahertz near-field probe as described herein. In one embodiment, such method comprises demodulating the output signal using a first reference signal having the first frequency for obtaining a first demodulated output signal. This method further comprises demodulating the output signal using a second reference signal having the second frequency for obtaining a second demodulated output signal. Optionally this method comprises demodulating the output signal using a third reference signal having the first or second frequency, wherein the third reference signal is phase-shifted with respect to the first or second reference signal respectively for obtaining a third demodulated output signal. This method further comprises processing the first and second and optionally third demodulated output signal for obtaining at least one of (i) a value indicative of the intensity of photoluminescence of the sample, and (ii) a value for the electric field that is caused by a terahertz probe pulse that has been reflected by or transmitted through the optically excited sample, and (iii) a value for the electric field that is caused by a terahertz probe pulse that has been reflected by or transmitted through the sample while not being optically excited.

One aspect of this disclosure relates to a computer program or suite of computer programs comprising at least one software code portion or a computer program product storing at least one software code portion, the software code portion, when run on a computer system, being configured for executing one or more of the method steps as described herein, for example the method steps relating to demodulating the output signal and/or the method steps relating to processing the first and/or second and/or third demodulated output signal as described herein and/or method steps relating to controlling components of the optical system to perform their respective functions.

One aspect of this disclosure relates a computer comprising a computer readable storage medium having computer readable program code embodied therewith, and a processor, preferably a microprocessor, coupled to the computer readable storage medium, wherein responsive to executing the computer readable program code, the processor is configured to perform one or more of the method steps described herein.

One aspect of this disclosure relates to a non-transitory computer-readable storage medium storing at least one software code portion, the software code portion, when executed or processed by a computer, is configured to perform one or more of the method steps as described herein.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

A known terahertz (THz) sensor system for time-resolved terahertz spectroscopy is described by Beard et al. in, J. Phys. Chem. B, Vol 106, No. 29, 7146-7159 (2002). Such terahertz sensor system uses ultra-short optical pulses, also called optical pump pulses, in order to photo-excite a sample. A subsequent terahertz probe pulse is used in order to generate a response which contains information regarding the photoconductive characteristics of the sample. A disadvantage of such known THz sensor systems is its limited spatial resolution. Due to the relatively long wavelength of terahertz radiation, the focal spot of a terahertz beam on a sample is typically around 1-10 mm wide. Hence the response signal comprises characteristics that are spatially averaged over this focal spot thereby substantially limiting the resolution of the system. Thus, such conventional far-field THz sensor system only allows determination of an average conductivity of an ensemble of samples of submicron dimensions, e.g. nanostructures or crystals.

In many situations however it is desired to measure the THz response of individual submicron samples having typical dimensions selected in the range between 0.1 and 100 micron. For example, in order to improve optoelectronic devices, it is crucial to understand factors that influence important device characteristics e.g. the conductivity. Such factors include the presence of edges, electrical contacts and/or spatial inhomogeneities which are often of submicron or even nano-scale size and cannot be individually studied using a conventional THz sensor system.

In contrast to far-field THz sensors, near-field terahertz sensors can spatially measure material characteristics such as photoconductivity at sub-wavelength resolution. WO 2010/091754 A1 describes a so-called near-field terahertz probe wherein the probe, typically a sharp probe tip, needs to be positioned in close proximity to the area of the sample that one would like to examine. The area that can be investigated by a terahertz probe in one measurement cycle is however small, typically in the range of 0.1-100 microns. Hence, although a near-field terahertz probe is very useful in examining small areas, such a sensor is not suitable for large scale commercial applications which requires fast examining and localizing of small areas of interest in a large-area sample. For example, such known terahertz probe is not suitable for fast localization and examination of factors including the presence of edges, electrical contacts and/or spatial inhomogeneities in VLSI integrated circuits (ICs) on a large semiconductor wafer.

In light of the above, there is a need in the art for improved terahertz sensor systems and methods for performing terahertz spectroscopy on a sample using such terahertz sensor systems. In particular, there is a need in the art for improved terahertz sensor systems that allow fast identification and examination of small areas of interest on large area samples with high resolution. a terahertz sensor system that is configured to efficiently examine ("scan") large-scale samples and to localize and examine small, submicron-scale areas of interests on the sample.

Therefore, in one aspect, this disclosure relates to a terahertz sensor system, e.g. a terahertz spectrometer, is wherein a far-field and a near-field THz sensor is combined on the basis of a computer connected to a computer-controlled spatial light modulator, e.g. a spatial light modulator. The computer controls the spatial light modulator using position information enabling efficient use of both the far-field and the near-field terahertz sensor.

In an aspect, the disclosure may relate to a terahertz sensor system. The system comprises a computer-controlled spatial light modulator that is configured to expose an area of a sample to excitation light. The excitation light creates excitations in the exposed area. The system furthermore comprises a far-field terahertz sensor that is configured to measure a far-field response associated with the excitations in the exposed area. The system further comprises a near-field terahertz probe configured to measure a near-field response in an area of interest of the sample while the probe is in close proximity to the area of interest. The terahertz sensor system also comprises a computer system that is configured to determine position information. The position information defines areas of investigation associated with different spatial positions on said sample. The computer system is also configured to use the position information to control the spatial light modulator to selectively expose one or more areas of investigation to excitation light. Furthermore, the computer system is configured to receive from the terahertz sensor a far-field response associated with the one or more exposed areas of investigation. Also, the computer system is configured to move the terahertz probe on the basis of the position information to a first position in one of the one or more areas of investigation, the first position defining a first area of interest, for measuring a near-field response in the first area of interest.

Hence, the terahertz sensor system uses a computer-controlled spatial light modulator to quickly identify and investigate small areas of interest on a large area sample. In particular, the sensor system enables to easily investigate a sample with different resolutions. This is beneficial because, in a first mode of operation, the system scans the sample using the position information and the computer-controlled spatial light modulator while performing lower resolution measurements with a far-field terahertz sensor, which may enable to identify areas on the sample that are worth investigating in closer detail (such as areas comprising surface inhomogeneities, e.g. surface inhomogeneities in graphene that significantly affect carrier mobility, or morphology variations, e.g. in perovskites). Then, in a second mode of operation, the position information and the computer-controlled spatial light modulator are used to scan one or more of these identified areas using a high resolution terahertz probe by moving the terahertz probe to an identified area using the position information. Hence, high resolution measurements on the identified areas can be obtained without the need to scan the entire sample with the terahertz probe.

It should be appreciated that in the context of this disclosure, resolution may relate to the inverse of the size of an area that is investigated with one terahertz probe pulse. Hence a smaller investigated area per terahertz probe pulse may relate to a higher resolution, whereas a larger investigated area per probe pulse may relate to a lower resolution.

Also, the terahertz system enables to quickly position the terahertz probe at a desired position. In particular, the system enables a swift change from the above mentioned first mode of operation to the second mode of operation. After all, the computer system is configured to use the same position information both for controlling the computer-controlled spatial light modulator, and thus for controlling which one or more areas are investigated, and for moving the terahertz probe to one of these areas. In other words, once the position information has been determined by the computer system, the system can readily perform far-field and near-field measurements for a specific area of investigation on the sample.

The computer-controlled spatial light modulator also conveniently obviates the need to move any one of the sample, the optical excitation beam, or the far-field sensor when different areas on the sample are to be investigated in succession.

The computer-controlled spatial light modulator is configured to expose an area of the sample to excitation light, which conveniently enables control of the resolution at which the sample is scanned in the first mode of operation. After all, only excitations are created in the (vicinity of the) exposed area. Hence, only these excitations perturb an incoming terahertz probe pulse and thus the far-field response is only associated with these excitations. Herewith e.g. the conductivity of only the exposed area of investigation may be characterized. If for example the computer-controlled spatial light modulator exposes only a small area, having for example a width of 0.1 millimeter, the scan resolution can be considered higher than would be the case if the computer-controlled spatial light modulator would expose a larger area, having for example a width of 2 millimeters. The computer-controlled spatial light modulator thus allows to scan a sample at a varying resolution in the first mode of operation and thus allows to scan a sample at varying speeds.

It should be appreciated that the system may comprise a terahertz emitter that is configured to emit a terahertz probe pulse. A terahertz probe pulse may comprise electromagnetic radiation of frequencies between 0.1 and 20 terahertz.

It should be appreciated that creating excitations in the area of investigation may comprise forming a photon-induced THz plasmonic region and/or creating excitons and/or polarons and/or free charge-carriers and/or surface plasmons and/or non-equilibrium states or causing any other change that may perturb a terahertz probe pulse.

A reflected component of a terahertz probe pulse may be reflected from the sample, whereas a transmitted component of the terahertz probe pulse may be transmitted through the sample. The terahertz sensor may be configured to measure the reflected component and/or the transmitted component. The terahertz probe may be configured to measure the reflected component and/or the transmitted component.

The terahertz probe may comprise a tip with a cantilever thickness between 1 and 100 micrometers. The probe may be a probe as disclosed by WO 2010/091754 A1.

It should be appreciated that the computer system may be configured to control the computer-controlled spatial light modulator on the basis of the position information to expose at least part of a first area of investigation and to, after the computer system has received from the terahertz sensor a far-field response for this first area, (i.e. after this first area has been investigated with one terahertz probe pulse), expose a second area of investigation.

The sensor system may further comprise an optical source for providing the excitation light.

In an embodiment of the system, the position information includes at least one grid of areas of investigation, wherein each area of investigation is associated with position coordinates for moving the terahertz probe to said area of investigation; optionally, an area of investigation having dimensions selected between 0.1 and 10 millimeters, preferably between 0.1 and 1 millimeter.

In an embodiment, an area of investigation comprises a grid of areas of interests, wherein each area of interest is associated with position coordinates for moving the terahertz probe to said area of interest; optionally, an area of interest having dimensions selected between 0.1 and 100 micrometers.

In an embodiment of the terahertz sensor system, the computer system is configured to select the one of the one or more areas of investigation on the basis of the received measured far-field responses for each exposed area of investigation and/or on the basis of a user input indicative of an area of investigation. This embodiment enables the one area of investigation to be automatically selected by the computer system and/or to be selected by a user of the terahertz sensor system.

The computer system may be configured to determine that the far-field response received for the one area of investigation deviates from other received far-field responses for other exposed areas of investigation.

In an embodiment of the sensor system the far-field response is generated by exposing at least part of the sample to at least one terahertz pulse simultaneously with or after exposing the at least part to the excitation light and the far-field terahertz sensor measuring a terahertz component reflected from said sample or transmitted through said sample. Alternatively or additionally, the near-field response is generated by exposing at least part of the sample to at least one terahertz pulse simultaneously with or after exposing the at least part to the excitation light and the near-field terahertz sensor measuring a terahertz component transmitted through said sample.

This embodiment enables simultaneous measurement of far-field and near-field responses of the one area of investigation. In this embodiment, the terahertz probe may not interfere with the far-field response measurements. Also the embodiment obviates the need to move the terahertz sensor when the terahertz probe is moved to the first position or when switching from the first mode of operation to the second mode of operation.

In another embodiment of the system the computer-controlled spatial light modulator comprises a plurality of pixels with adjustable opacity or a plurality of pixels with deformable or rotatable mirrors. In another embodiment of the system, the computer-controlled spatial light modulator comprises LCD pixels and/or micro-mirrors. In these embodiments an LCD-based SLM or a micro-mirror based SLM may be used to locally expose an area of investigation of the sample.

In another embodiment the computer system is configured to move the terahertz probe to a second position on the basis of the position information in order to measure a second near-field response in a second area of interest in the one area of investigation. An advantage of this embodiment is that it enables to obtain a high resolution image of the one area of investigation.

The computer system may be configured to move the probe to the second position in close proximity of the second area of interest after the computer system has received from the terahertz probe a near-field response for the first area of interest. The computer system may be configured to move the tip to the second position on the basis of the first position. The method may comprise moving the probe to the second position in close proximity of the second area of interest after receiving from the terahertz probe a near-field response for the first area of interest. The method may also comprise moving the tip to the second position on the basis of the first position.

A different aspect of the disclosure relates to a method for terahertz sensing. The method comprises determining position information, the position information defining areas of investigation associated with different spatial positions on a sample. The method further comprises using the position information to control a computer-controlled spatial light modulator to selectively expose one or more areas of investigation to excitation light. The light creates excitations in the exposed area. Also, the method comprises receiving from a far-field terahertz sensor a far-field response associated with the one or more exposed areas of investigation. Furthermore, the method comprises moving a terahertz probe on the basis of the position information to a first position in one of the one or more areas of investigation, the first position defining a first area of interest, for measuring a near-field response in the first area of interest.

In an embodiment of the method, the position information includes at least one grid of areas of investigation, wherein each area of investigation is associated with position coordinates for moving the terahertz probe to said area of investigation; optionally, an area of investigation having dimensions selected between 0.1 and 10 millimeters, preferably between 0.1 and 1 millimeter.

In an embodiment of the method, an area of investigation comprises a grid of areas of interests, wherein each area of interest is associated with position coordinates for moving the terahertz probe to said area of interest; optionally, an area of interest having dimensions selected between 0.1 and 100 micrometers.

In an embodiment of the method, the method comprises selecting the one of the one or more areas of investigation on the basis of the received measured far-field responses for each exposed area of investigation and/or on the basis of a user input indicative of an area of investigation.

In an embodiment of the method the far-field response is generated by exposing at least part of the sample to at least one terahertz pulse simultaneously with or after exposing the at least part to the excitation light and the far-field terahertz sensor measuring a terahertz component reflected from said sample or transmitted through said sample and/or the near-field response is generated by exposing at least part of the sample to at least one terahertz pulse simultaneously with or after exposing the at least part to the excitation light and the near-field terahertz sensor measuring a terahertz component transmitted through said sample.

In an embodiment of the method, the computer-controlled spatial light modulator is controlled to adjust an opacity of a plurality of pixels with adjustable opacity or to deform or rotate mirrors of a plurality of pixels with deformable or rotatable mirrors.

In an embodiment of the method, the computer-controlled spatial light modulator comprises LCD pixels and/or micro-mirrors.

In one embodiment of the method, the method comprises moving the terahertz probe to a second position on the basis of the position information in order to measure a second near-field response in a second area of interest in the one area of investigation.

Another aspect of the disclosure is further related to a computer program or suite of computer programs comprising at least one software code portion or a computer program product storing at least one software code portion, the software code portion, when run on a computer system, being configured for executing the method steps as described above.

The technology will be further illustrated with reference to the attached drawings, which schematically will show embodiments. It will be understood that the invention is not in any way restricted to these specific embodiments.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "computer system" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a computer system, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing computer system of the terahertz sensor or be stored upon manufacturing of these systems.

Embodiments of the present invention will be further illustrated with reference to the attached drawings, which schematically will show embodiments according to the invention. It will be understood that the present invention is not in any way restricted to these specific embodiments.

To summarize part of the above, this disclosure may be understood to also relate to the subject of the following numbered clauses.

1. A terahertz sensor system comprising:

a computer-controlled spatial light modulator that is configured to expose an area of a sample to excitation light, the light creating excitations in the exposed area;

a far-field terahertz sensor that is configured to measure a far-field response associated with the excitations in the exposed area;

a near-field terahertz probe configured to measure a near-field response in an area of interest of the sample while the probe is in close proximity to the area of interest;

a computer system that is configured to:

determine position information, the position information defining areas of investigation associated with different spatial positions on said sample;

use the position information to control the spatial light modulator to selectively expose one or more areas of investigation to excitation light;

receive from the terahertz sensor a far-field response associated with the one or more exposed areas of investigation;

move the terahertz probe on the basis of the position information to a first position in one of the one or more areas of investigation, the first position defining a first area of interest, for measuring a near-field response in the first area of interest.

2. The sensor system according to clause 1 wherein the position information includes at least one grid of areas of investigation, wherein each area of investigation is associated with position coordinates for moving the terahertz probe to said area of investigation; optionally, an area of investigation having dimensions selected between 0.1 and 10 millimeters, preferably between 0.1 and 1 millimeter.

3. The sensor system according to clause 2 wherein an area of investigation comprises a grid of areas of interests, wherein each area of interest is associated with position coordinates for moving the terahertz probe to said area of interest; optionally, an area of interest having dimensions selected between 0.1 and 100 micrometers.

4. The sensor system according to any of clauses 1-4, wherein the computer system is further configured to:

select the one of the one or more areas of investigation on the basis of the received measured far-field responses for each exposed area of investigation; and/or on the basis of a user input indicative of an area of investigation.

5. The sensor system according to any of clause 1-4, wherein the far-field response is generated by exposing at least part of the sample to at least one terahertz pulse simultaneously with or after exposing the at least part to the excitation light and the far-field terahertz sensor measuring a terahertz component reflected from said sample or transmitted through said sample; and/or, wherein the near-field response is generated by exposing at least part of the sample to at least one terahertz pulse simultaneously with or after exposing the at least part to the excitation light and the near-field terahertz sensor measuring a terahertz component transmitted through said sample.

6. The sensor system according to one or more of the preceding clauses, wherein the computer-controlled spatial light modulator comprises a plurality of pixels with adjustable opacity or a plurality of pixels with deformable or rotatable mirrors.

7. The sensor system according to one or more of the preceding clauses, wherein the computer-controlled spatial light modulator comprises LCD pixels and/or micro-mirrors.

8. The sensor according to one or more of the preceding clauses, wherein the computer system is further configured to:

move the terahertz probe to a second position on the basis of the position information in order to measure a second near-field response in a second area of interest in the one area of investigation.

9. A method for terahertz sensing comprising:

determining position information, the position information defining areas of investigation associated with different spatial positions on a sample;

using the position information to control a computer-controlled spatial light modulator to selectively expose one or more areas of investigation to excitation light, the light creating excitations in the exposed area;

receiving from a far-field terahertz sensor a far-field response associated with the one or more exposed areas of investigation;

moving a terahertz probe on the basis of the position information to a first position in one of the one or more areas of investigation, the first position defining a first area of interest, for measuring a near-field response in the first area of interest.

10. The method according to clause 9 wherein the position information includes at least one grid of areas of investigation, wherein each area of investigation is associated with position coordinates for moving the terahertz probe to said area of investigation; optionally, an area of investigation having dimensions selected between 0.1 and 10 millimeters, preferably between 0.1 and 1 millimeter.

11. The method according to clause 10 wherein an area of investigation comprises a grid of areas of interests, wherein each area of interest is associated with position coordinates for moving the terahertz probe to said area of interest; optionally, an area of interest having dimensions selected between 0.1 and 100 micrometers.

12. The method according to any of clauses 9-11, further comprising:

selecting the one of the one or more areas of investigation on the basis of the received measured far-field responses for each exposed area of investigation; and/or on the basis of a user input indicative of an area of investigation.

13. The method according to any of clause 9-12, wherein the far-field response is generated by exposing at least part of the sample to at least one terahertz pulse simultaneously with or after exposing the at least part to the excitation light and the far-field terahertz sensor measuring a terahertz component reflected from said sample or transmitted through said sample; and/or, wherein the near-field response is generated by exposing at least part of the sample to at least one terahertz pulse simultaneously with or after exposing the at least part to the excitation light and the near-field terahertz sensor measuring a terahertz component transmitted through said sample.

14. The method according to one or more of the preceding clauses 9-13, wherein the computer-controlled spatial light modulator is controlled to adjust an opacity of a plurality of pixels with adjustable opacity or to deform or rotate mirrors of a plurality of pixels with deformable or rotatable mirrors.

15. The method according to one or more of the preceding clauses 9-14, wherein the computer-controlled spatial light modulator comprises LCD pixels and/or micro-mirrors.

16. The method according to one or more of the preceding clauses 9-15, further comprising:

moving the terahertz probe to a second position on the basis of the position information in order to measure a second near-field response in a second area of interest in the one area of investigation.

17. A computer program or suite of computer programs comprising at least one software code portion or a computer program product storing at least one software code portion, the software code portion, when run on a computer system, being configured for executing the method according to one or more of the clauses 9-16.

BRIEF DESCRIPTION OF THE DRAWINGS

Aspects of the invention will be explained in greater detail by reference to exemplary embodiments shown in the drawings, in which:

FIGS. 11A and 11B depict at least part of a terahertz sensor system according to various embodiments;

DETAILED DESCRIPTION OF THE DRAWINGS

Figure 1B:
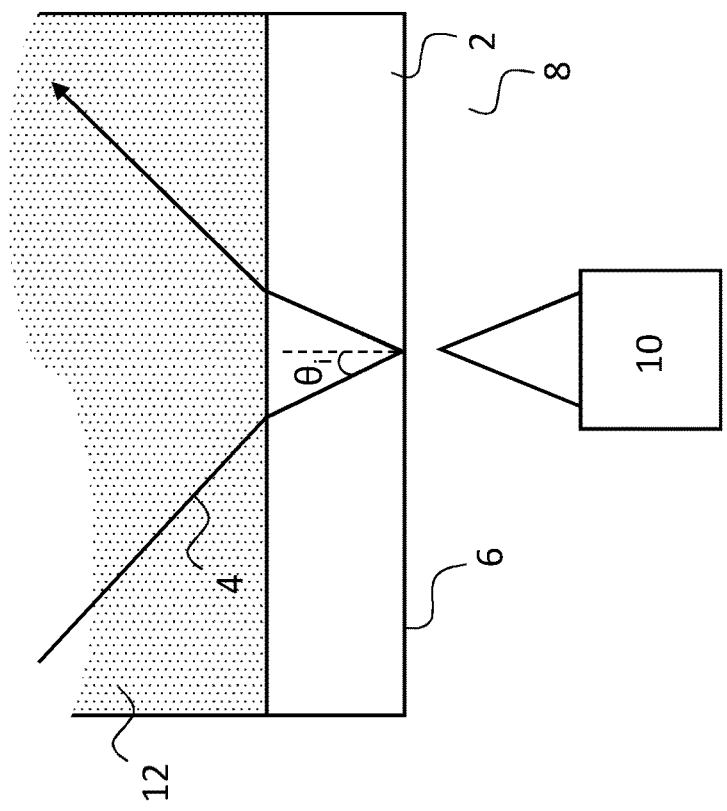
FIG. 1 illustrates a system according to an embodiment.

In the figure description identical reference numerals indicate similar or identical elements.

Figure 1A:
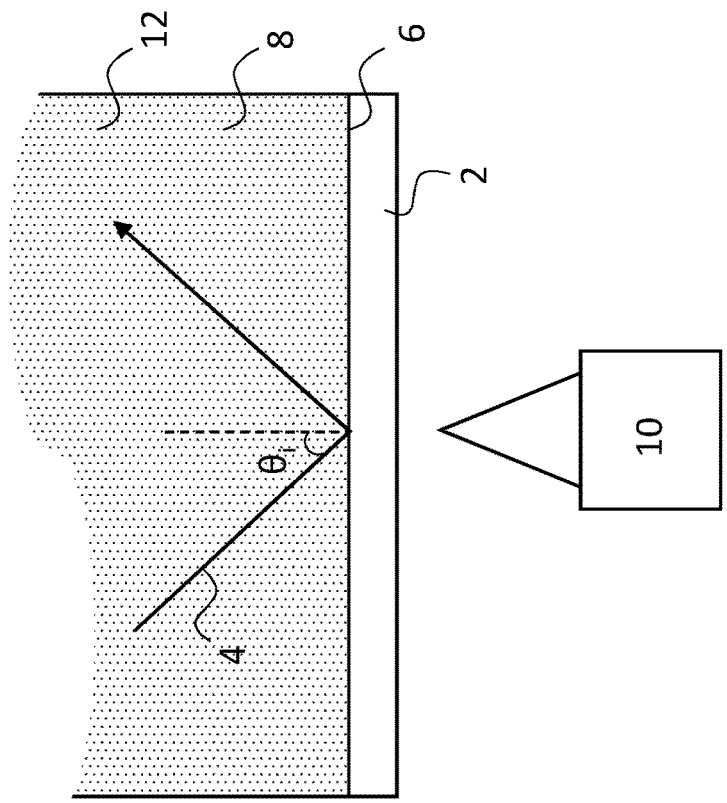

FIG. 1A shows a system for measuring an electric field in the near-field region of an optically excited sample 2. The system comprises an optical system for directing excitation light 4 onto an interface 6 between the sample 2 and a medium 8 under an angle of incidence $\theta_i$ such that total internal reflection of the excitation light 4 occurs at the interface 6. The system further comprises a terahertz near-field probe 10 for measuring said electric field. The terahertz near-field probe 10 is positioned on one side of said interface 6 and the optical system is configured such that the excitation light 4 approaches the interface 6 on another side of said interface 6.

The terahertz near-field probe 10 may comprise a terahertz near-field probe, preferably a photoconductive near-field terahertz probe, in which case measuring the electric field comprises directing an optical probe pulse on the terahertz near-field probe 10.

In another example, the terahertz near-field probe comprises an electro-optic crystal that is placed in the near-field region of the sample. As the terahertz probe pulse and an optical probe pulse, that is directed onto the crystal, co-propagate through the electro-optic crystal, a phase modulation is induced on the optical probe pulse which depends on the electric field of the terahertz radiation. As known, this phase modulation can be measured using quarter wave plates to measure the electric field.

FIG. 1A in particular illustrates an embodiment wherein optically exciting at least part of the sample comprises directing the excitation light 4 through the medium 8 onto said interface 6.

The sample 6 can be a semiconductor, particularly a direct band gap semiconductor, such as gallium arsenide, and can be grown onto the medium 8, 12, which may be a quartz substrate.

The optical system for directing the excitation light may comprise at least one of a mirror, a focusing element, such as a lens, a beam splitter, et cetera.

FIG. 1B illustrates an embodiment, wherein optically exciting at least part of the sample 2 comprises directing the excitation light 4 through the sample 2 onto said interface 6. In this configuration, the light approaches the interface 6 from a further medium 12. The first medium 8 in this embodiment is typically air.

Near-field microscopy enables the measurements of samples 2 smaller than the diffraction limit. An excited sample 2 for this purpose is for example an exfoliated 2D-transition metal dichalcogenide (2D-TMD). These exfoliated flakes are usually smaller than 100 microns and irregular in the number of layers. TMDs can become direct semiconductors when they are a monolayer thick. At THz frequencies these 2D semiconductors are intrinsically transparent, but become highly absorbing when they are photo-excited. This makes 2D-TMDs interesting materials for applications such as atomically thin active devices at THz frequencies.

Figure 2:
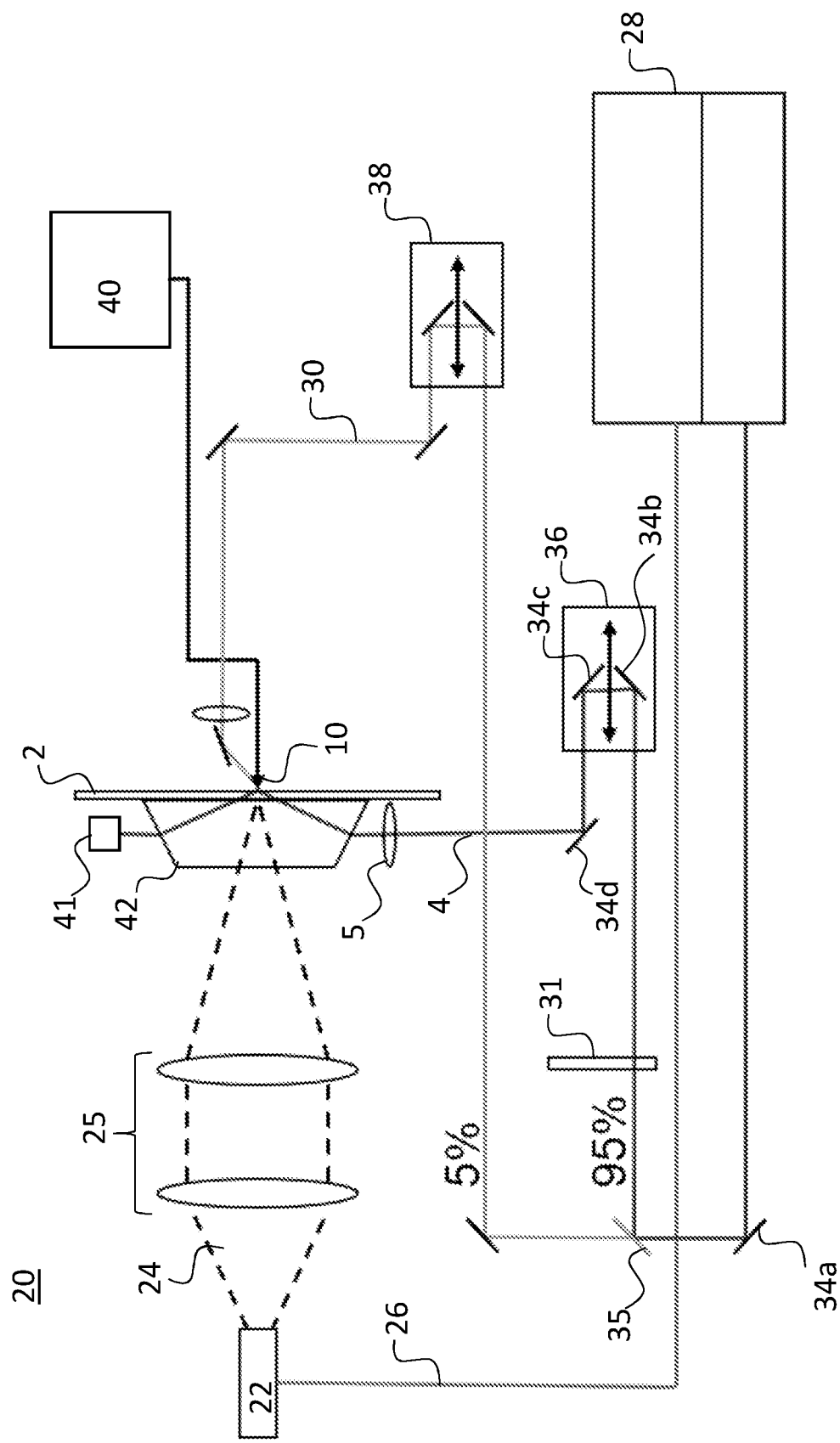
FIG. 2 illustrates a terahertz microscopy system according to an embodiment.

FIG. 2 shows a terahertz near-field microscope system 20 according to an embodiment, and shows in particular an optical-pump near-field terahertz microscope system 20.

The system 20 comprises terahertz near-field probe 10 that is configured to measure the electric field in the near-field region of the sample 2. To that end, at least part of the probe is positioned in close proximity to the sample 2, in particular in close proximity to an area of the sample that is to be investigated, which may be referred to as an area of interest. Here, close proximity may include probe tip-sample height within a range of 0.1-10 microns. The terahertz near-field probe 10 may comprise a probe tip comprising a (cantilever) thickness between 1 and 100 micrometers. Due to the dimensions of the probe tip, the area of interest that a probe 10 can investigate with one measurement is typically between 1 and 100 micrometers.

In one embodiment, the system 20 comprises a terahertz emitter 22 for emitting a terahertz probe pulse 24. The terahertz emitter 22 may be configured to emit such terahertz probe pulse 24 upon reception of a laser pulse 26.

The terahertz probe pulse 24 may be generated using different well-known THz generation schemes, e.g. using a non-resonant optical rectification of the laser pulse 26 in a 1 mm thick <110> ZnTe crystal, ultra-fast charge transport (photoconductive switch), surface-field emission, photo-Dember effect, four-wave mixing, etc. The terahertz probe pulse 24 may comprise electromagnetic radiation of frequencies between 0.1 and 100 terahertz. The terahertz microscope system 20 may comprise an optical system 25 configured to (weakly) focus the terahertz probe pulse 24 onto sample 2.

The terahertz probe pulse 24 may be directed onto sample 2, e.g. using (parabolic) mirrors (not shown). The terahertz probe pulse 24 may travel through, and/or may be reflected from (not shown), the sample 2 while excitations are present in the sample 2. The terahertz probe pulse 24 may thus be incident on sample 2 shortly after excitation light 4 has created optical excitations in at least part of the sample 2. The excitations may perturb the terahertz probe pulse 24 yielding a terahertz response leaving the sample 2 that can be detected by the terahertz near-field probe 10.

In one embodiment, the system 20 comprises a light source system 28 for generating excitation light 4, such as optical excitation pulses. Light source system 28 may be a laser, such as a Ti:sapphire mode locked laser, that is configured to generate laser light (pulses) of a predetermined wavelength. Excitation light 4 may be an optical excitation pulse having an energy selected within a range between 0.01 and 10 mJ. The excitation light 4 is used as an optical pump pulse on sample 2 in order to create excitations, e.g. free charge-carriers, in sample 2. Sample 2 for example is a thin film semiconductor.

Further, the light source system 28 may also be configured to generate an optical probe pulse 30 for causing the terahertz near-field probe 10 to measure the electric field. The optical probe pulse 30 may be configured as a focused pulse having a diameter of a few hundreds of micrometers and an energy of 1-100 nJ and may be used as trigger for detecting terahertz radiation by the photoconductive terahertz near-field probe 10. Further, the light source system 28 may be configured to generate the light 26 based on which the terahertz emitter 22 emits the terahertz probe pulse 24.

The light source system 28 may comprise means, such as an optical chopper 31, for modulating at least one of excitation light 4 and light 26 for generating terahertz probe pulses 24.

The terahertz microscope system 20 comprises an optical system that is configured to direct excitation light 4 onto the interface 6 between the sample 2 and the medium under an angle of incidence such that total internal reflection of the excitation light occurs at the interface. The optical system may comprise one or more mirrors, such as mirrors 34a, 34b, 34c and 34d, and one or more beam splitters such as beam splitter 35, and optical device 42 that is configured to refract the excitation light 4 towards the interface 6.

An additional lens 5 may be located before the excitation light 4 enters the optical device 42 to increase optical power of the excitation light 4. This lens 5 focusses the excitation light to a spot at the sample resulting in higher pump fluence directly in front of the terahertz near-field probe 10. The spot may have at least one dimension, such as a width, between 10-100 micrometer, such as 20 micrometer. Increasing the amount of photo-excited free carriers where the terahertz near-field probe is sensitive results in a larger differential transmittance, i.e., the ratio of the THz intensity transmitted through the sample with and without an optical pump.

The system may comprise one or more optical delay lines 36, 38 that may be configured to time the optical excitation light 4, optical probe pulse 30 and terahertz probe pulse 24 with respect to each other. In particular, optical delay line 36 may be used to time the reception at sample 2 of the excitation light 4 with respect to the reception at sample 2 of terahertz probe pulse 24. Controlling the time delay between the optical pump and the THz pulse probing the sample 2 enables an accurate investigation of carrier dynamics in photo-excited samples. Delay line 38 may be used to time the reception at terahertz near-field probe 10 of the optical probe pulse 30 with respect to the terahertz probe pulse 24 on the sample 2. Delay line 38 effectively controls the instance at which the terahertz near-field probe 10 measures the electric field caused by the terahertz probe pulse that has been transmitted through the sample 2. The delay line 38 may be fixed during measurements such that in each measurement a maximum amplitude of a passing terahertz probe pulse is measured.

In order to measure a reference electric field, an electromagnetic terahertz probe pulse 24 may be directed onto the sample when the sample is not optically excited. The probe pulse 24 then also transmits through and/or reflects from the sample and the reference electric field caused by the terahertz probe pulse that has reflected from and/or transmitted through the sample may be measured.

Excitation light 4 may also be directed onto the sample without directing a terahertz probe pulse onto the sample, which allows to measure the intensity of any photoluminescence of the sample caused by the excitation light. A photoconductive terahertz near-field probe is also sensitive to light (electromagnetic radiation in the so-called visible and near-infrared region of the electromagnetic spectrum). When the near-field probe is used to measure an electric field caused by terahertz radiation, upon reception of an optical probe pulse, a transient population of charge carriers is created which are accelerated by the electric field towards electrodes of the probe, as a result of which a current is measured that depends on the present electric field. Hence, light caused by photoluminescence of the sample and incident on the photoconductive near-field probe can create charge carriers in addition to the charge carriers generated by the optical probe pulse. The charge carries, in the absence of an electric field, diffuse herewith causing a diffusion current that can be measured by the near-field probe. The signal as output by the terahertz near-field probe is thus indicative of the intensity of the photoluminescence of the sample since the diffusion current depends on the number of generated charge carriers, which number depends on the photoluminescence intensity incident on the near-field probe. It should be noted that the photoluminescence also contributes to the signal as output by the near-field probe, when the charge carriers are driven by an electric field caused by terahertz radiation.

Separately detecting an intensity of photoluminescence, an electric field caused by a terahertz probe pulse that has been transmitted through and/or reflected from the sample that is not optically excited, and an electric field that is present when a terahertz probe pulse passes the terahertz near-field probe after it has been transmitted and/or reflected through the optically excited sample, enables to accurately study the effects of the optical excitations on the terahertz probe pulse. The signal as output by the terahertz near-field probe during the latter measurement may namely comprise contributions from photoluminescence as explained above, which can be corrected for if known.

The system 20 further comprises a data processing system 40 for storing and processing the measurements as output by the terahertz near-field probe 10. The processing system for example comprises an amplifier, such as a lock-in amplifier. Furthermore, the data processing system 40 may comprise a control module that is configured to control at least one of the delay line 36, delay line 38, the terahertz emitter 22, the terahertz near-field probe 10, the light source system 28 and a sample holder for positioning the sample. The control module may for example control the light source system 28 to generate laser pulses and may as such be understood to direct excitation light onto the interface 6.

One manner for measuring these electric fields comprises using a digital acquisition (DAQ) card which enables measuring different states for arbitrary time windows. With a DAQ it is possible to define an interval to measure the electric fields during a certain time interval.

In a particular example, the light source system 28 comprises an Er-doped fiber laser operating at 1560 nm, which produces a train of 100 fs long pulses at a repetition rate of 100 MHz with an average power of 500 mW. 20 mW of this optical power is sent to an InGaAs/InAlAs photoconductive antenna 22 generating a train of THz pulses with the same repetition rate. The generated spectrum has a central frequency of 1.5 THz and a bandwidth of approximately 3 THz. The remaining light is frequency doubled to 780 nm and used for both the near-field detection and the photo-excitation of the sample 2. The terahertz near-field probe 10 comprises a micro-structured photoconductive antenna (TeraSpike TD-800-X, Protemics GmbH). These photoconductive terahertz near-field probes consist of a small and thin layer of low-temperature grown GaAs (LT-GaAs) with gold electrodes on top. As the 780 nm pulse 30 (optical probe 5 mW) hits the LT-GaAs, it creates a transient population of excited carriers in the semiconductor. The impinging THz field 24 accelerates these short-lived charges towards the electrodes, leading to a photocurrent with amplitude and sign proportional to the electric field at the location of the terahertz near-field probe 10 during photoexcitation. The orientation of the electrodes relative to the THz field allows for the separation of independent polarization components in the THz near-field. The timing between the optical probe and the THz pulse is given by a computer controlled delay stage (NP-ILS150CCL) 38, allowing to sample the THz waveform in the time-domain as in conventional THz-TDS (terahertz time-domain spectroscopy) systems. The electrical bias for the THz generation on the emitter is modulated at a frequency of 1500 Hz to generate a differential photocurrent that is amplified and detected using a lock-in amplifier 40 (SR 7270) to suppress dark current and reduce noise. The majority (95%) of the 780 nm light is sent through an additional delay stage 36 towards the sample 2 for photo-excitation. Upon arrival this pump pulse 4 will induce a population of free-carriers, which will absorb the incoming THz radiation 24. A mechanical chopper 31 (NF-3501) modulates the pump at a frequency of 1 kHz to evaluate the THz near-field transmission through the sample 2 with and without pumping in rapid succession.

Figure 3A:
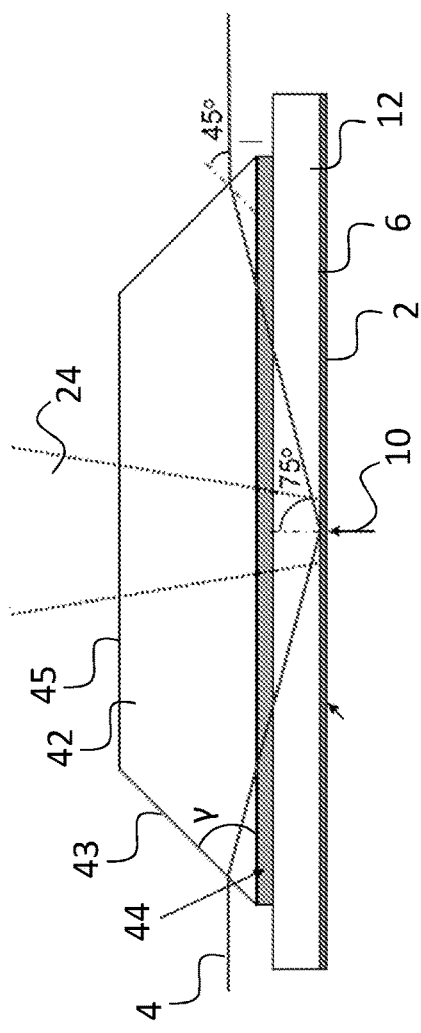
FIG. 3. shows a number of optical systems for directing the excitation onto the interface according to respective embodiments.
Figure 3B:
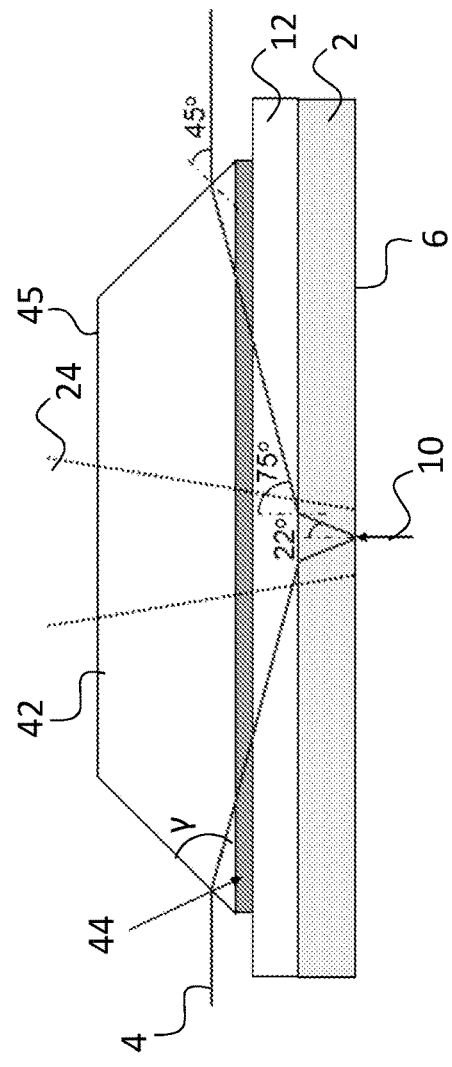

FIGS. 3A and B illustrate that the optical system for directing the excitation light comprises an optical device 42. In this example, the optical device is a prism, in particular a Dove prism. Surface 43 of the optical device 42 is oriented at an angle γ with respect to the interface 6. When excitation light 4 is incident on the surface it is refracted towards interface 6. FIG. 3A shows an embodiment, wherein the sample 2 is positioned between the interface 6 and the terahertz near-field probe 10. FIG. 3B shows an embodiment, wherein the interface 6 is positioned between the sample 2 and the terahertz near-field probe 10.

The angle γ between the interface and the surface 42 may be between 0 and 90 degrees, preferably between 30 and 60 degrees, more preferably between 40 and 50 degrees, most preferably approximately 45 degrees.

In one embodiment, the sample 2 interfaces with a substrate medium 12, for example a substrate medium 12 onto which the sample 2 has been grown. In a particular example, the substrate medium 12 comprises a quartz substrate onto which the sample 2 has been grown and the optical device also consists of quartz. In one embodiment, the optical device 42 is applied to the substrate medium 12. Preferably, the substrate medium 12 and the optical device 40 have approximately the same index of refraction.

In one embodiment, the optical device 42 is applied to the substrate medium 12 using a liquid layer 44 between the substrate medium 12 or sample 2 and the optical device 42, the liquid layer 44 preferably having the same index of refraction as the substrate medium 12 or sample 2 respectively and as the optical device 42. The liquid layer 44 allows the optical device 42 and the substrate medium 12 to move with respect to each other without damaging either of them. Hence, 2D maps of the sample can be formed.

In the configuration of FIG. 3B, preferably, the excitation light is p-polarized and preferably the angle of incidence under which the excitation light falls onto the interface between the sample and the substrate medium 12 is close to the Brewster angle so that the reflection of the excitation light 4 off this interface is minimized and substantially all light is coupled into the sample 2. This reduces power losses due to reflection.

FIGS. 3A and 3B show that the electromagnetic terahertz probe pulse 24 is directed onto the optically excited sample 2 by directing the probe pulse 24 onto a surface 45 of the optical device 42, which surface 45 is perpendicular to the direction of propagation of the terahertz probe pulse 24. This allows the THz probe pulse 24 to pass through relatively unperturbed.

In FIG. 3B, which shows a particular example, the sample comprises a thin film (3 micrometer thick) of GaAs on a quartz substrate (1 mm thick). GaAs is one the most studied and well understood semiconductors and has a band gap at 875 nm, such that the photon energy of the 780 nm excitation laser can photo-excite free carriers. The GaAs may be located on 3 quarters of a 2 inch quartz substrate. Bare quartz should give an identical response with and without the pump laser (excitation light). If this is the case, any differential THz transmission measured on the thin film GaAs can be attributed to photo-excited free carriers, making this sample ideal for testing the setup. The large angle of incidence on the quartz-GaAs interface requires the pump beam 4 to be p-polarized. This angle is close to the Brewster angle, meaning that nearly all light gets transmitted into the GaAs. The angle of incidence of the GaAs-air interface is approximately 22 degrees, which is sufficiently large for total internal reflection to occur. The high refractive index of 3.7 of GaAs results in a reflection of approximately 93%.

The microprobe 10, THz pulse 24, and excitation spot together may define the optical axis of the microscope system 20. The sample 2 is brought into contact with the prism 42 using a thin layer of index matching liquid 44 to ensure optical contact, while maintaining freedom to move parallel to the interface 6. The THz probe pulse 24 is incident onto the sample 2 at normal incidence through the Dove prism. In order to maintain the photoexcited area along the optical axis, the sample 2 can slide in the plane perpendicular to the terahertz near-field probe 10 with the help of computer controlled stages, enabling the spatial mapping of the transmitted THz electric near-field while the sample 2 undergoes photo-excitation. Note that during such a scan the sample 2 may move and the prism may be kept stationary with respect to the optical axis.

For testing the setup, one embodiment may comprise measuring the power of the excitation light leaving the optical device 42 after it has excited the sample, for example using a photodetector 41 as shown in FIG. 2. On quartz and in the ideal case, i.e., no absorption, no scattering, and perfect index matching liquid, the light exiting the optical device should be 98% of the incident light. The 2% reduction may be due to reflection at the two side facets of the prism.

In an example, the measured powers before and after the optical device were 44 and 36 mW, respectively, which corresponds to a transmittance of 82%. Displacing the sample such that the pump beam 4 is incident onto the GaAs reduces the transmitted power to 14 mW. Due to the p-polarization of the light beam 4, GaAs should not cause significant reflections, so nearly all the reduction in the transmitted power, i.e., 61%, can be attributed to absorption in the thin film of GaAs.

Figure 3C:
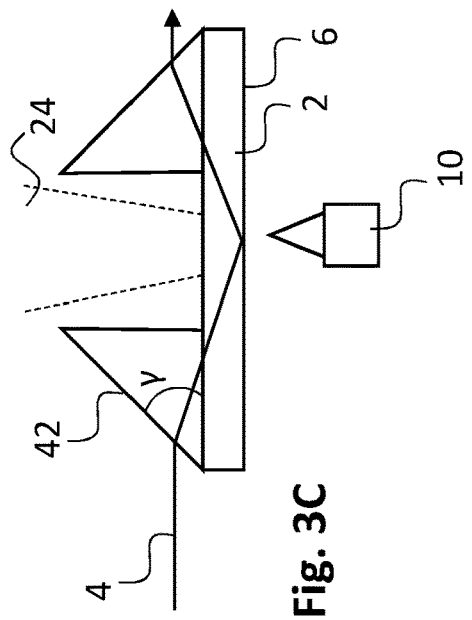

Although FIGS. 3A and 3B depicts that the optical system comprises a Dove prism, it should be appreciated that other configurations are possible. FIG. 3C illustrates an embodiment wherein a triangular prism 42 is used for directing the excitation light 4 onto the interface 6.

Figure 4:
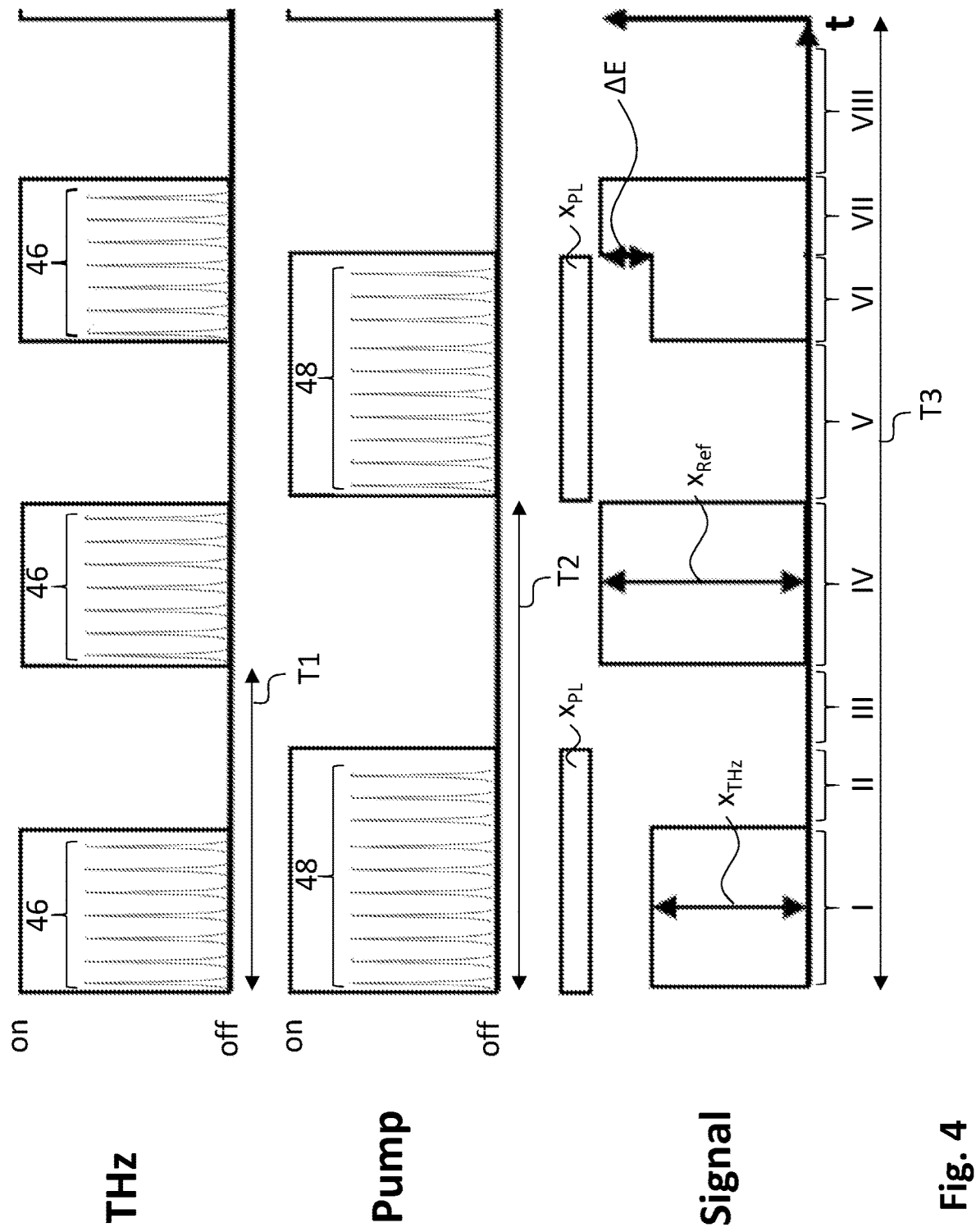
FIG. 4 illustrates first and second periodic signals that are applied to the sample in one embodiment.

FIG. 4 shows a first periodic signal, "THz", comprising terahertz probe pulses 46 that may be applied to the sample 2. Applying the signal comprises repeatedly directing terahertz probe pulses onto the sample. The first periodic signal has a first frequency of 1/T1, e.g. of 1500 HZ. In the example that is shown, one period T1 of the signal comprises a first time duration in which terahertz probe pulses are regularly incident on the sample 2 and a second time duration in which no terahertz probe pulses are incident on the sample 2. In an example, during the first time duration, the probe pulses follow each other with a repetition rate of 100 MHz.

FIG. 4 further shows a second periodic signal, "Pump", that may be applied to the sample 2 simultaneously with the first periodic signal. Applying the second signal comprises repeatedly directing optical excitation pulses 48 onto the sample 2. The second signal has a second frequency of 1/T2, e.g. of 1 kHz. A period T2 of the second signal also comprises a first time duration in which repeatedly optical excitation pulses 48 incident on the sample 2 and a second time duration in which no optical pulses are incident on the sample 2. In an example, during the first time duration, the optical excitation pulses follow each other with a repetition rate of 100 MHz.

Preferably, the first and second frequency are not sub-harmonic with respect to each other in order to reduce noise. The light source system may comprise an optical chopper in order to apply the second periodic signals to the sample 2. The optical chopper may be used to modulate the optical excitation pulses. The first periodic THz signal may be modulated by periodically applying a bias voltage on the emitter 22, such as a photoconductive antenna, at the required frequency.

It should be appreciated that while the first and second signals are applied, the delay lines preferably are not changed during a few periods of the output signal.

While the first and second signals are applied to the sample, the electric field is measured by the terahertz near-field probe 10 and the terahertz near-field probe outputs the measured values as an output signal "Signal". Preferably, the time between two measurements corresponds to the time between two terahertz pulses 46 in the first time duration of the first periodic signal and/or to the time between two optical excitation pulses 48 in the first time duration of the second signal.

FIG. 4 schematically shows one period T3 of an output signal "Signal" as output by the terahertz near-field probe. In the particular example shown, the period T3 comprises eight time durations I-VIII. The output signal during time duration I is partly caused by photoluminescence of the sample, of which the contribution to the output signal may be called x_PL, and partly caused by a terahertz probe pulse that has been reflected from and/or transmitted through the optically excited sample, the contribution of which pulse to the output signal may be called x_THz. Measured values of time duration II only comprises a contribution from x_PL, because no terahertz probe pulses are incident on the sample 2. Measured values of time duration III do not comprise contributions from any of the described phenomena and thus only dark counts are involved. The output signal during time duration IV is only caused by terahertz probe pulses that have been reflected from and/or transmitted through the sample 2 while the sample is not optically excited, because no optical excitation pulses are incident on the sample 2. These contributions to the measured electric field may be called x_Ref. For time duration V, x_PL contributes. For time duration VI, x_PL and x_THz contribute. For time duration VII, x_Ref contributes. For time duration VII neither x_PL nor x_THz nor x_Ref contribute (only dark counts).

In one embodiment, the first and second periodic signal are applied to the sample, such that the output signal during a period T3 comprises at least one output value that comprises a contribution from x_PL and not from x_Ref nor x_THz and at least one output value that comprises a contribution from x_Ref and not from x_PL nor x_THz and at least one output value that comprises contributions from x_PL and x_THz and not from x_Ref.

Thus, based on the first and second periodic signal applied to the sample, the output signal is known in the sense that for each value of the output signal it is known which phenomenon contributes to the signal as output by the terahertz near-field probe. Herein, a first phenomenon relates to one or more terahertz probe pulses that have been reflected by or transmitted through the optically excited sample, a second phenomenon relates to one or more terahertz probe pulses that have been reflected by or transmitted through the sample that is not optically excited and a third phenomenon relates to photoluminescence of the sample.

Since the reference signals used for demodulation are known, e.g. the reference signals with which the output signal is multiplied when the output signal is demodulated, the contributions of the different phenomena to each demodulated signal can be determined.

To illustrate, if the output signal as shown in FIG. 4 is demodulated using a first reference signal Ref1, wherein the first reference signal is a square wave having a maximum value of 1 and a minimum value of −1 and having a frequency of the first periodic signal, "THz", the first reference signal being in-phase with the output signal, then the first demodulated output signal is also known as explained below.

Figure 5:
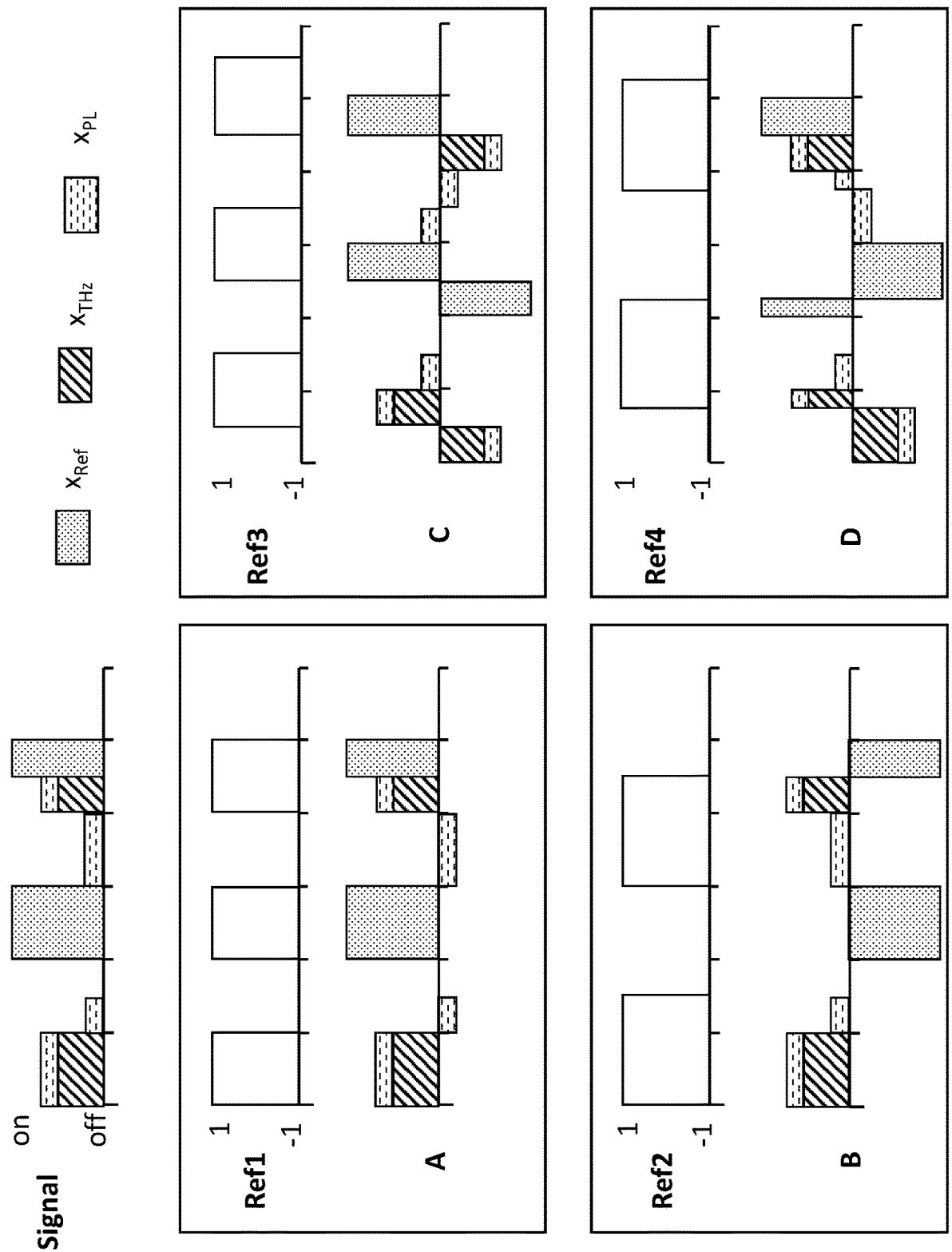
FIG. 5 illustrates the demodulation of an output signal.

FIG. 5 illustrates for the output signal "Signal" as shown in FIG. 4, for four different reference signals Ref1, Ref2, Ref3 and Ref4, the signals A, B, C, D resulting from a multiplication of the output signal with the respective reference signals. From each of these signals A, B, C, D, a demodulated output signal can be obtained by applying a low pass filter to the respective signals A, B, C, D in order to obtain the DC component of these signals. Such obtained DC component may be understood to be a demodulated output signal. Typically a lock-in amplifier outputs such a DC component as a constant value. The DC component of a signal can be found by integrating one period of the signal. In this case, the DC component, x_1, of signal A can thus be expressed in terms of x_Ref, x_THz and x_PL, by integration of one period of A. In this example, the demodulated output signal x_1 can thus be expressed as (see the top left box of FIG. 5):

$$x_1 = x_{Ref}(1+0.5) + x_{THz}(1+0.5) + x_{PL}(1-0.5-1+0.5) = 1.5x_{Ref} + 1.5x_{THz}.$$

Similarly, as shown, if the output signal is demodulated using a second reference signal Ref2, wherein the second reference signal is a square wave having a maximum value of 1 and a minimum value of −1 and having a frequency of the second periodic signal, the second reference signal being in-phase with the output signal, then the second demodulated output signal may be expressed as a (constant) value (see the bottom left box of FIG. 5):

$$x_2 = x_{Ref}(-1-0.5) + x_{THz}(1+0.5) + x_{PL}(1+0.5+1+0.5) = -1.5x_{Ref} + 1.5x_{THz} + 3x_{PL}.$$

Herein, the output signal and a reference signal being in phase relates to the situation wherein the start of the output signal's period as depicted in FIG. 4 coincides with the rise of a square pulse of the reference signal.

If the output signal is demodulated using a third reference signal Ref3, wherein the third reference signal Ref3 is a square wave having a maximum value of 1 and a minimum value of −1 and having a frequency of the first periodic signal, THz, the third reference signal being phase-shifted with respect to the first reference signal by 90 degrees, then the third demodulated output signal may be expressed as a (constant) value (see the top right box of FIG. 5):

$$y_1 = x_{Ref}(-0.5+0.5+0.5) + x_{THz}(-0.5+0.5-0.5) + x_{PL}(-0.5+0.5+0.5+0.5-0.5-0.5) = 0.5x_{Ref} - 0.5x_{THz}.$$

The expressions for x_1, x_2 and y_1 above may be rewritten as:

$$x_{THz} = (x_1 - 3y_1)/3$$

$$x_{Ref} = (x_1 + 3y_1)/3$$

$$x_{PL} = (x_2 + 3y_1)/3$$

Note that x_1, x_2 and y_1 are measured values that are output of demodulation the output signal. Note the demodulation using Ref3 is one possibility and that another reference signal Ref4 may also be used in this analysis.

In this manner, the first and second and optionally third demodulated output signal may be processed for obtaining at least one of x_PL: a value indicative of the intensity of the photoluminescence of the sample, and x_THz: a value indicative of the electric field that is caused by a terahertz probe pulse that has been reflected by or transmitted through the optically excited sample, and x_Ref: a value indicative of the electric field that is caused by a terahertz probe pulse that has been reflected by or transmitted through the sample while not being optically excited.

In another example (not shown in FIG. 5), the third reference signal is a square wave having a maximum value of 1 and a minimum value of −1 and having a frequency of the second periodic signal, the third reference signal being phase-shifted with respect to the second reference signal such that the third reference signal leads the second reference signal by 60 degrees, then the third demodulated output signal may be expressed as a (constant) value:

$$y_2 = 0.5x_{THz} + x_{PL} - 0.5x_{Ref}.$$

y_2 instead of e.g. x_1 or x_2 or y_1 may be used to determine the respective values of the electric field.

Applying the terahertz probe pulses and optical excitation pulses as periodic signals to the sample is thus advantageous, because it allows the output signal to be demodulated herewith reducing noise. This modulation, together with the modulation of the THz emitter, allows for self-referenced differential transmission measurements.

Figure 6:
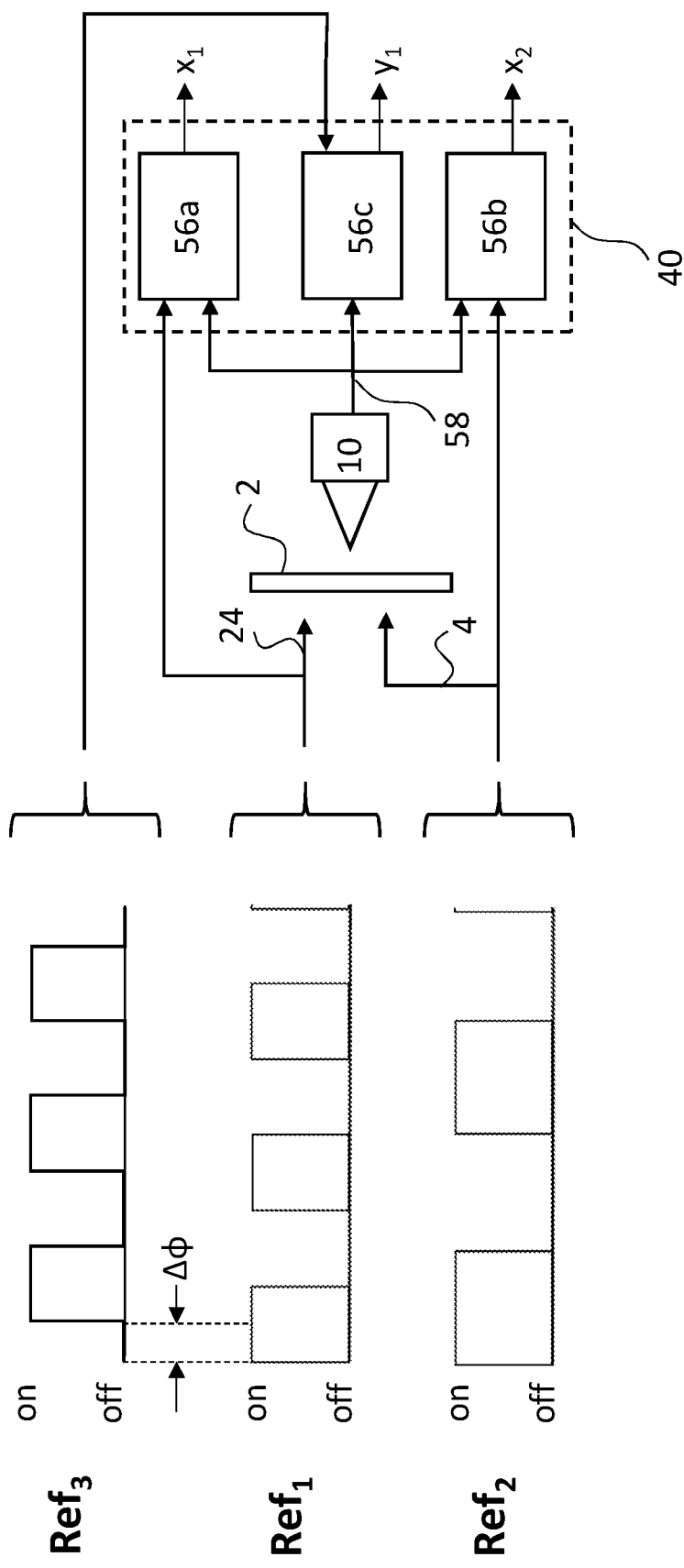
FIG. 6 illustrates the system comprising one or more demodulation systems for demodulating the output signal according to an embodiment.

FIG. 6 schematically shows the system 20 according to one embodiment. In this embodiment, the system 20 comprises a first demodulation system 56a, a second demodulation system 56b and optionally a third demodulation system 56c.

As explained above, the terahertz probe pulses and optical excitation pulses may be applied to the sample 2 as first and second period signals respectively.

The terahertz near-field probe 10 repeatedly measures the electric field and forms an output signal 58 that is fed to the first 56a and second 56b and optionally third 56c demodulation system.

Each demodulation system may be configured to demodulate the output signal using a reference signal in the sense that each is configured to multiply the output signal with the reference signal and to obtain a DC component from the resulting signal, for example by applying a low pass filter.

The first demodulation system is configured to demodulate the output signal using a first reference signal having the same frequency as the first periodic signal "THz" for obtaining a first demodulated output signal x_1. The first reference signal may be, or may be based on, the first periodic signal as shown. In particular, the signal that is used to control a bias on the terahertz emitter may be taken as the basis of Ref1.

The second demodulation system 56b is configured to demodulate the output signal using a second reference signal having the same frequency as the second periodic signal "Pump" for obtaining a second demodulated output signal x_2. The second reference signal may be, or may be based on, the second periodic signal as shown. In particular, the signal that is used to control the optical chopper for modulating the optical excitation pulses, may be taken as the basis of Ref2.

Preferably, the demodulation systems 56a, 56b and 56c are phase-locked with respect to each other to prevent phase drift between them, which would impede accurate measurements.

Configuring a reference signal such that it is in-phase with the first or second periodic signal applied to the sample may be performed by maximizing a DC component, i.e. a demodulated signal, as output by a demodulation system. To illustrate, if the first periodic signal comprising the terahertz probe pulses is applied to the sample without applying the second periodic signal comprising the optical excitation pulses, the signal as output by the near-field probe would only comprise the x_Ref component. It is easily understood that the DC component of a signal resulting from a multiplication of such output signal with a reference signal having the same frequency as the first periodic signal is maximum when the output signal and reference signal are in-phase. Hence, ensuring that the first reference signal is in-phase with the first periodic signal may comprise applying the first periodic signal only and adjusting the phase of the first reference signal until demodulation system 56a outputs a maximum value.

However, the reference signals are not necessarily fed to the demodulation systems. The demodulation systems may be configured to internally generate a reference signal having a desired frequency.

The third demodulation system 56c is configured to demodulate the output signal using a third reference signal E_3 having the same frequency as the first periodic signal but being phase-shifted by Δφ with respect to the third reference signal as shown, for obtaining a third demodulated output signal y_1.

Figure 7:
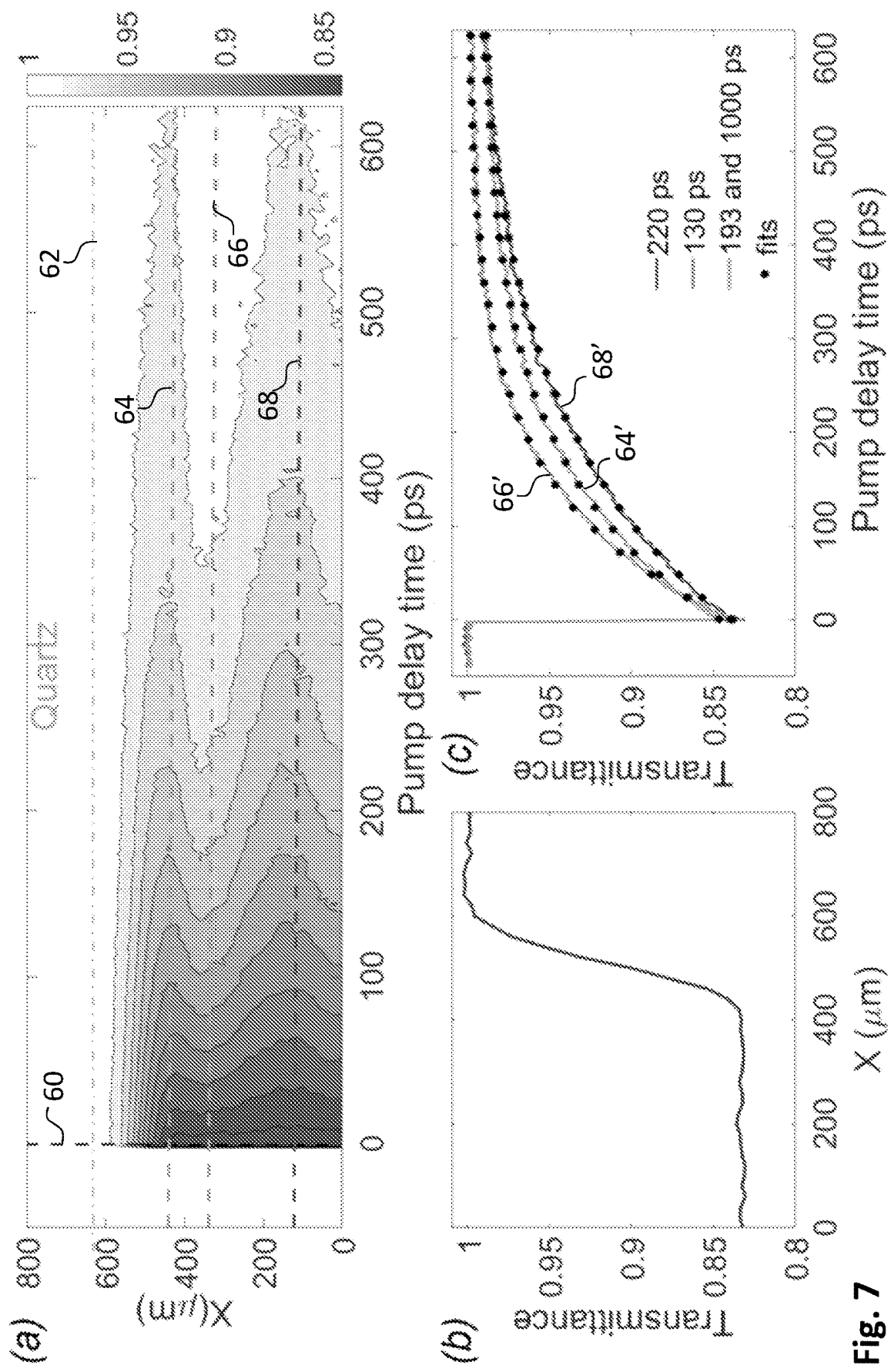
FIGS. 7 and 8 shows measurement results that can be obtained using a method and system according to embodiments.

One embodiment comprises, for each of a plurality of area of interests on the sample determining for a plurality of pump delay times x_THz and optionally x_Ref. The pump delay time may be defined as the time duration between an optical excitation pulse being incident on the sample and a terahertz probe pulse being incident on the sample. Based on x_THz and x_Ref, the transmittance can be determined, e.g. by Transmittance=x_THz/x_Ref. These measurements may yield a plot as shown in FIG. 7a.

It is important to know the spatial resolution of the terahertz near-field probe with a focused excitation spot for studying the carrier dynamics of poorly understood materials in subdiffraction length scales. Local variations in material properties can change the differential transmittance measurement both in the maximum difference and in the total decay time. Spatially dependent TRDT measurements have been performed and are shown in FIG. 7a. The sample is displaced by 800 micrometer along a line 60 in 40 steps, during which the terahertz near-field probe 10 moves over the GaAs edge 62 on bare quartz. In FIG. 7a a clear transition between GaAs and quartz, indicated by the dasheddotted grey line 62, can be observed near x=600 micrometer. This is depicted more clearly in FIG. 7b, where the maximum differential transmittance is shown as a function of the spatial position. There are three regimes: GaAs until x=400 micrometer, quartz after x=600 micrometer, and a boundary between these. The maximum differential transmittance on the GaAs is constant at 16%, while quartz does not show any response. The boundary between GaAs and quartz is measured to be 150 micrometer long, which is limited by several factors. The excitation spot size and terahertz near-field probe resolution limit the resolution of the setup. Also scattering of the pump beam and THz radiation at the edge between GaAs and quartz limit the resolution due to the large refractive index mismatch and the layer thickness, which results in significant light scattering. In FIG. 7a variations on subdiffraction length scales of the decay time are visible. The variations are depicted more clearly in FIG. 7c where the decay times of the TRDT measurements are shown for three spatial points, indicated by the horizontal lines 64, 66, 68 in FIG. 7a. The traces 68' and 66' indicate the longest (220 ps) and shortest (130 ps) decay times measured, respectively. This significant difference is most probably caused by defects near line 66. The line 64 is located close to the edge of the GaAs and trace 64' shows an additional exponential contribution with a decay time of 1 ns, this second exponential could be a result of boundary effects.

Figure 8:
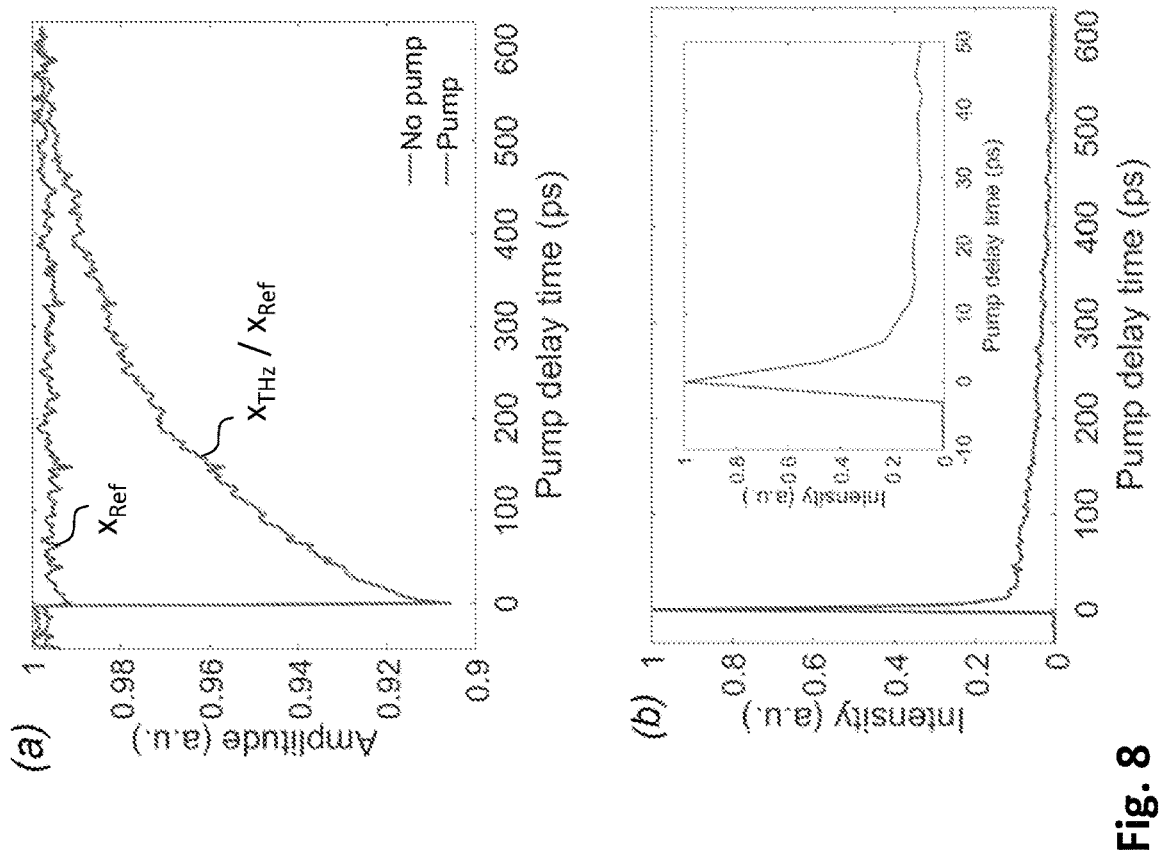

In FIG. 8a, x_Ref and x_pump/x_Ref (transmittance) are shown, where there seems to be no trace of the photoluminescence in the signal. Using the methods described herein, advantageously, x_THz does not contain any contributions from photoluminescence of the sample as a result of which the lifetime of optical excitations can be accurately determined.

FIG. 8b shows x_THz/x_Ref, also called the transmittance, as well as x_Ref as a function of pump delay time, which may be understood to be the time period between an optical excitation pulse being incident on the sample and a terahertz probe pulse being incident on the sample. Note that the pump delay time may be controlled by controlling delay line 36 as shown in FIG. 2. The inset shows the same signal on a shorter timescale. Advantageously, the methods as described herein ensure that the transmittance measurement is not distorted by contributions from photoluminescence of the sample. The technologies as described herein, thus enable to measure, during one experiment and using only one near-field probe both a terahertz near-field response of an optically excited sample as well as an intensity of photoluminescence of the sample.

Figure 9:
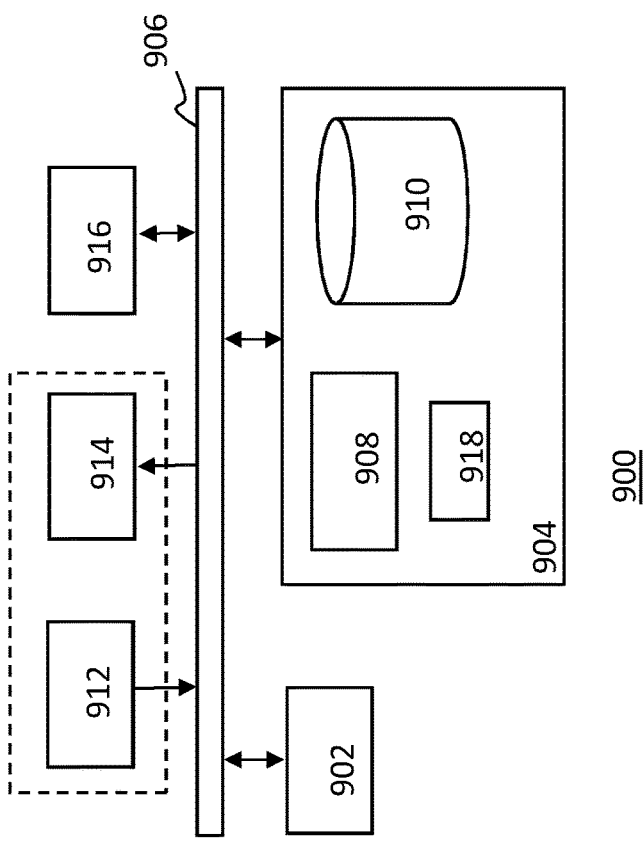
FIG. 9 schematically shows a data processing system according to an embodiment.

FIG. 9 depicts a block diagram illustrating an exemplary data processing system according to one embodiment.

As shown in FIG. 9, the data processing system 900 may include at least one processor 902 coupled to memory elements 904 through a system bus 906. As such, the data processing system may store program code within memory elements 904. Further, the processor 902 may execute the program code accessed from the memory elements 904 via a system bus 906. In one aspect, the data processing system may be implemented as a computer that is suitable for storing and/or executing program code. It should be appreciated, however, that the data processing system 900 may be implemented in the form of any system including a processor and a memory that is capable of performing the functions described within this specification.

The memory elements 904 may include one or more physical memory devices such as, for example, local memory 908 and one or more bulk storage devices 910. The local memory may refer to random access memory or other non-persistent memory device(s) generally used during actual execution of the program code. A bulk storage device may be implemented as a hard drive or other persistent data storage device. The processing system 900 may also include one or more cache memories (not shown) that provide temporary storage of at least some program code in order to reduce the number of times program code must be retrieved from the bulk storage device 910 during execution.

Input/output (I/O) devices depicted as an input device 912 and an output device 914 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 912 and the output device 914). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 916 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 900, and a data transmitter for transmitting data from the data processing system 900 to said systems, devices and/or networks. Modems, cable modems, and Ethernet cards are examples of different types of network adapter that may be used with the data processing system 900.

As pictured in FIG. 9, the memory elements 904 may store an application 918. In various embodiments, the application 918 may be stored in the local memory 908, the one or more bulk storage devices 910, or apart from the local memory and the bulk storage devices. It should be appreciated that the data processing system 900 may further execute an operating system (not shown in FIG. 9) that can facilitate execution of the application 918. The application 918, being implemented in the form of executable program code, can be executed by the data processing system 900, e.g., by the processor 902. Responsive to executing the application, the data processing system 900 may be configured to perform one or more operations or method steps described herein.

In one aspect of the present invention, the data processing system 900 may represent a data processing system 40, a control module, a demodulation system 56a as described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 902 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

Figure 10:
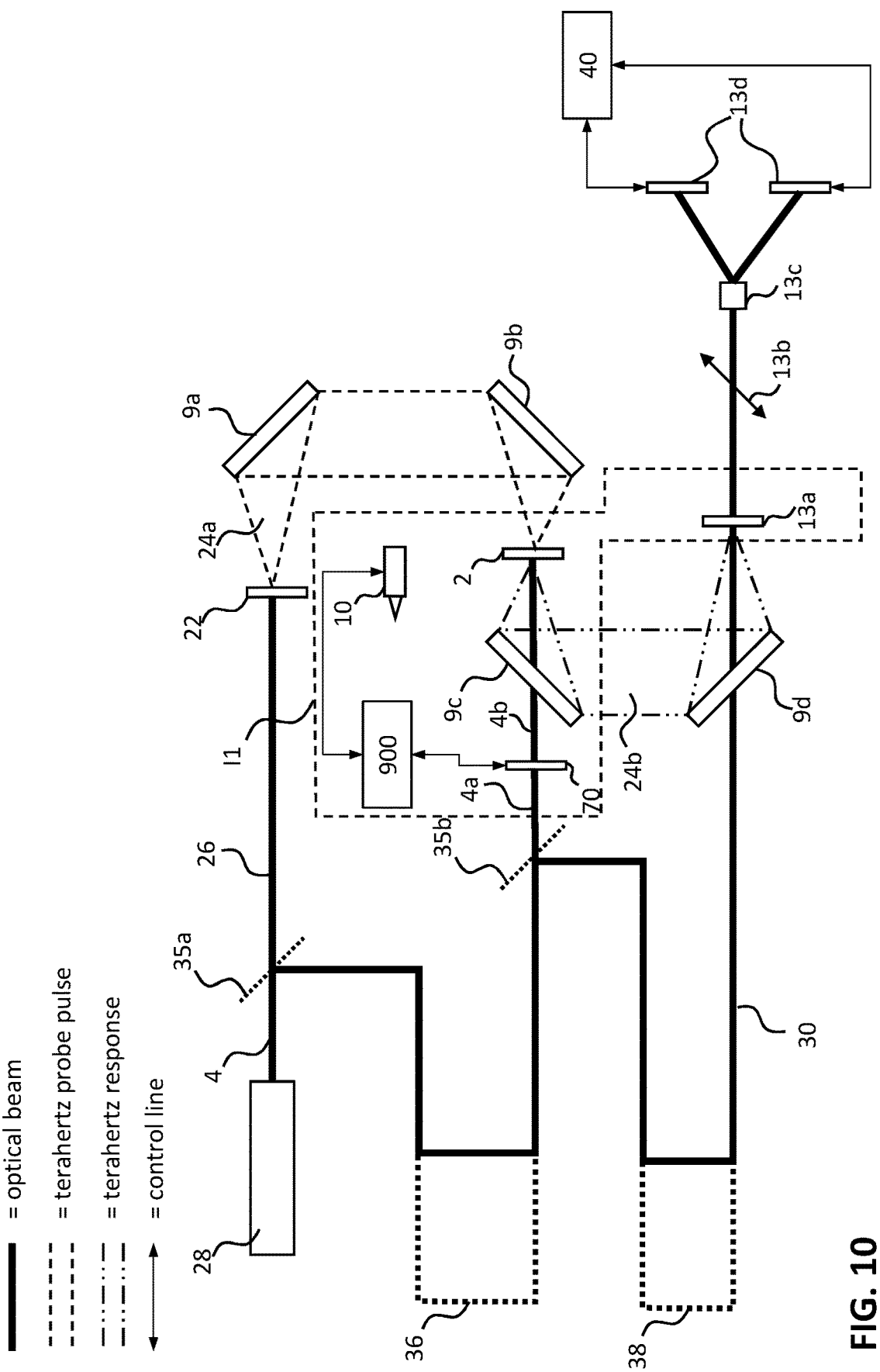
FIG. 10 depicts a terahertz sensor system according to an embodiment.

FIG. 10 depicts an example of a terahertz sensor system according to an embodiment. The depicted terahertz sensor system is configured as an optical-pump terahertz sensor system. The system may comprise an optical source 28 for providing excitation light 4. The optical source 28 may be configured to provide excitation light 4 in the form of one or more excitation light pulses. Alternatively, the optical source may be configured to provide the excitation light in the form of an optical excitation light beam. Optical source 28 may be a laser, such as a Ti:sapphire mode locked laser, that is configured to generate laser light (pulses) 4 of a predetermined wavelength.

In an embodiment, the laser pulses may be selected to have a pulse duration selected between 10-1000 fs duration, a wavelength selected between 200-2000 nm, and a pulse energy selected between 0.1-10 mJ. The optical source 28 may be configured to generate such laser pulses 4 with a repetition rate selected between $0.1$-$10^6$ kHz. Also the optical source 28 may comprise an optical source controller (not shown) for controlling the intensity (fluence) of the excitation light 4.

In an embodiment, the terahertz sensor system comprises an optical system that is configured to split excitation light. The optical system may for example split an excitation light pulse 4 into three separate laser pulses. To that end, the optical system in FIG. 1 may comprise optical splitters 35a and 35b for splitting a laser pulse in three laser pulses. The first laser pulse 26 may have an energy that is sufficient to excite a terahertz emitter 22 and may for example be configured as a collimated 2 mm diameter pulse. The second laser pulse 4a may have an energy selected within a range between 0.01 and 10 mJ and may be used as an optical pump pulse on sample 10 in order to create excitations, e.g. free charge-carriers, in sample 2. Sample 2 for example is a thin film semiconductor. The third laser pulse 30, which may be regarded as an optical probe pulse, may be configured as a focused pulse having a diameter of a few hundreds of micrometers and an energy of 1-100 nJ and may be used as trigger for detecting terahertz radiation by the terahertz sensor 13.

As shown, the terahertz sensor system may comprise a terahertz emitter 22 that may be configured to emit a (broadband) terahertz probe pulse 24 upon reception of the first laser pulse 26. The terahertz radiation 24 may be generated using different well-known THz generation schemes, e.g. using a non-resonant optical rectification of the laser pulse 3a in a 1 mm thick <110> ZnTe crystal, ultra-fast charge transport (photoconductive switch), surface-field emission, photo-Dember effect, four-wave mixing, etc. The terahertz probe pulse 24 may comprise electromagnetic radiation of frequencies between 0.1 and 20 terahertz. The terahertz sensor system may comprise one or more (parabolic) mirrors or lenses 9a and 9b that may be configured to (weakly) focus the terahertz probe pulse 24 onto sample 10.

The terahertz sensor system comprises a far field terahertz sensor 13 that is configured to measure a far field response associated with excitations in an area of the sample 2. Different well-known far field terahertz sensors may be used. For example, terahertz sensor 13 may comprise at least one of a <110> ZnTe crystal 13a, which may be approximately 0.5 mm thick, a quarter wave plate 13b, a beam-splitting polarizer 13c that may be configured to decompose incident light into its horizontal and vertical components, and two balanced photodiodes 13d.

The terahertz sensor 13 may be configured to measure terahertz radiation upon reception of a laser pulse 30, in particular upon incidence of laser pulse 30 onto crystal 13a. The terahertz sensor, in particular crystal 13a, may be configured to polarize light, e.g. laser pulse 30, that at one moment travels through the sensor, in particular through crystal 13a, in dependence of the magnitude and/or sign of terahertz radiation that at that same moment travels through sensor 13, in particular through crystal 13a. Terahertz sensor 13 may make use of free-space electro-optic sampling (FSEOS).

In contrast to conventional terahertz sensor systems, the depicted embodiment of the system comprises a computer-controlled spatial light modulator 70 that is configured to selectively expose an area 28 (see also FIG. 2) of a sample to excitation light 4. The computer-controlled spatial light modulator 70 may be configured to geometrically shape excitation light 4. For example, the spatial light modular may be configured to partially block and/or partially let pass excitation light 4a, thereby generating a geometrically shaped excitation light 4b, in particular a geometrically shaped excitation light beam or light pulse 4b. The geometrically shaped light pulse 4b may be incident on sample 2 thereby exposing an area of the sample at particular position. This area may be may be referred to as an area of investigation 28. Hence, the computer-controlled spatial light modulator may in this manner expose an area of investigation to excitation light 4b.

Furthermore, the depicted embodiment comprises a terahertz probe 10 configured to measure a near-field response of the sample. To that end, the probe must be brought in close proximity to an area of the sample, which may be referred to as an area of interest. Here, close proximity may include probe tip-sample height within a range of 0.1-10 microns. The terahertz probe may comprise a probe tip comprising a (cantilever) thickness between 1 and 100 micrometers. Due to the dimensions of the probe tip, the area of interest that a probe can measure in one measurement cycle is of reduced size, typically between 0.1 and 100 micrometres.

The sensor system comprises a computer system 900 for controlling the light sources, the spatial light modulator, the far field sensor and the near field probe in order to determine terahertz responses of the sample. In one measurement cycle the computer system may control exposure of an area of investigation to excitation light and to a terahertz pulse and the detection of reflected and/or transmitted terahertz components originating from the sample by terahertz detectors, i.e. the far field sensor and the near field probe.

The computer system 900 is configured to determine position information that defines areas of investigation associated with different spatial positions on the sample 2 and use this information for both controlling the spatial light modulator 70 and controlling the movements of the terahertz probe 10. As will be described hereunder in more detail, the position information in combination with the spatial light modulator enables the terahertz sensor system can quickly identify and investigate interesting areas on large-scale samples.

The computer system 900 is configured to receive from the terahertz sensor 13 far-field responses for exposed areas of investigation. Such a far-field response may be measured as follows. Laser pulse 26 may be guided onto terahertz emitter 22 upon which the emitter 22 may emit a broad terahertz pulse 24. Laser pulse 4b may be directed onto sample 2 creating excitation in an area of the sample exposed to laser pulse 4b. A lens with a predetermined focal length (e.g. 150 mm) may be used to project the excitation light onto a surface of the sample (not shown). Laser pulse 30 may be directed onto terahertz sensor 13 and may be used as trigger for detecting terahertz radiation.

As shown, the terahertz probe pulse 24 may be directed onto sample 2, e.g. using (parabolic) mirrors 9a and 9b. The terahertz probe pulse 24 may travel through, and/or may be reflected from (not shown), the sample 2 while said excitations are present in the sample, in particular in the exposed area of investigation. The terahertz probe pulse 24 may thus be incident on sample 2 shortly after laser pulse 4b. The excitations may perturb the terahertz probe pulse 24 yielding a terahertz response 24b leaving the sample 2. The terahertz response 24b may be guided by (parabolic) mirrors 9c and 9d onto the terahertz sensor 13, in particular onto crystal 13a of terahertz sensor 13.

The terahertz sensor 13 may measure the far-field response for the exposed area of investigation. The terahertz sensor 13, in particular the crystal 13a, may polarize laser pulse 30 in dependence of the magnitude and sign of the terahertz radiation of the terahertz response 24b that travels through sensor 13 at the same moment as laser pulse 30 travels through the sensor 13.

The polarized light pulse may then travel through quarter wave plate 13b and may be decomposed into horizontal and vertical components by the beam-splitting polarizer 13c. These components may be measured by two balanced photodiodes 13d which may yield a measure for the sign and magnitude of the terahertz radiation of the terahertz response that travelled through sensor 13 at the same moment as laser pulse 30. The computer system 900 may be operatively coupled to the two balanced photodiodes 13d so that computer system 900 can receive the measured data of the far-field measurements from the photodiodes 13d, i.e. the measured data representing the far-field response of the exposed area of investigation.

The sensor system may comprise one or more optical delay lines 36, 38 that may be configured to time laser pulses and terahertz probe pulses with respect to each other. In particular, optical delay line 36 may be used to time the reception at sample 2 of the excitation light 4b with respect to the reception at sample 2 of terahertz probe pulse 24. Controlling the time delay between the optical pump and the THz pulse probing the sample enables an accurate investigation of carrier dynamics in photo-excited samples. Delay line 38 may be used to time the reception at far-field sensor 13 of the far-field terahertz response 24b with respect to the reception of laser pulse 30. Delay line 38 effectively controls which point of the terahertz response 24b is measured by terahertz sensor 13.

The received far-field response for a specific area of investigation may provide an incentive to investigate the specific area of investigation in closer detail using a high resolution near field probe. The system can then readily move the probe 26 to a desired position for investigating the specific area of investigation with the terahertz probe, because the position information required for moving the probe has already been determined.

For a near-field measurement with a terahertz probe, excitations may be generated in the sample as described above and a terahertz probe pulse may be generated as described above. Also, optical delay line 36 may be used as described above to time the reception at the sample of the terahertz probe pulse with respect to the excitation light being incident on sample 2. The near-field probe 10 may be configured to measure a near-field response upon reception of an optical probe pulse. Hence, the terahertz sensor system may comprise an optical system to direct an optical probe pulse onto the near-field probe. Also, the terahertz sensor system may comprise an optical delay line with which this optical probe pulse may be timed with respect to the terahertz probe pulse on the sample.

FIGS. 11A and 11B depict part of a terahertz sensor system according to various embodiments of the invention. In particular, FIGS. 11A and 11B depict two different modes of operation of the elements depicted in the inset I of FIG. 10. FIG. 11A shows the embodiment sensor system in a first mode of operation and FIG. 11B in a second mode of operation.

The orientation of the terahertz probe beam 24 with respect to sample 2 and with respect to optical pump beam 4a is not the same as depicted in FIG. 10. However, the same principles described with reference to FIG. 10 apply, i.e. an area of investigation 28 is exposed to excitation light, which creates excitations in the area of investigation 28, the terahertz sensor 13 is configured to measure a far-field response associated with the excitation in the area of investigation 28, and the terahertz probe 10 is configured to measure a near-field response in an area of interest of the sample while the probe is in close proximity to the area of interest. Hence, it should be understood that the depicted laser pulse 4b, which may be a geometrically shaped laser pulse, may be incident on sample 2 prior to the terahertz probe pulse 24. Also, computer system 900 determines position information that defines a plurality of areas of investigation which are associated with different spatial positions on sample 2.

In the first mode of operation (FIG. 11A), excitation light, in particular laser pump pulse 4a, is incident on computer-controlled spatial light modulator 70. The computer controlled spatial light modulator 70 uses the position information to selectively expose area of investigation 28 to excitation light. In particular, the computer controlled spatial light modulator 70 may, based on the position information, adopt a specific state to expose the area of investigation to excitation light. The spatial light modulator may comprise pixels, e.g. LCD pixels, and the specific state may relate to one or more of those pixels having an opaque state and one or more other pixels having a transparent state.

Also, the spatial light modulator 70 may make use of MEMS technology and may comprise deformable mirrors. In such MEMS-based spatial light modulators each pixel may comprise a piezoelectric-controlled mirror. When applying a voltage to the piezoelectric of a mirror, the mirror moves over a desired amount thereby allowing to change the light intensity that originates from a pixel from a maximum value (bright pixel) to a minimum value (dark pixel).

The computer-controlled spatial light modulator 70 may be understood to geometrically shape the excitation light, e.g. optical excitation beam 4a, yielding a geometrically shaped optical excitation beam 4b. The excitation light 4b creates excitations in the area of investigation 28.

The terahertz probe pulse 24, that may travel through sample 2 shortly after the excitations are created, may be perturbed by the excitations in the (vicinity of the) area of investigation 28, which may yield a terahertz response 24b. It should be understood that the laser pulse being incident on sample 2 and terahertz probe pulse 24 being incident on sample 2 may be timed using an optical delay line, e.g. optical delay line 36. Terahertz sensor 13 measures the (far-field) response 24b associated with the excitations in the exposed area of investigation 28. Terahertz sensor 13 may comprise any type of known terahertz sensor, such as an electro-optic sensor and/or a thermal sensor and/or a photoconductive sensor. An electro-optic sensor may comprise an element that is configured to polarize traversing light in dependence of the magnitude and/or sign of terahertz radiation that is present near or at the element, such as a <110> ZnTe crystal 12a. An electro-optic sensor 13 may further comprise a quarter wave plate 13b, a beam-splitting polarizer 13c and two balanced photodiodes 13d as described with reference to FIG. 10. A thermal sensor may comprise material that heats up in response to incident terahertz radiation. A photoconductive sensor may comprise material having a charge carrier mobility that is dependent on the incident terahertz radiation. The terahertz response may be guided onto far-field sensor 13 using reflective elements such as (parabolic) mirrors. Far-field sensor 13 may measure the terahertz radiation as described with reference to FIG. 10. Note that the optical probe pulse 30 that may be used as trigger for measuring terahertz radiation at sensor 13 is not shown in FIG. 11A. Computer system 900 receives from far-field sensor 13 a far-field response for area of investigation 28. Near-field sensor 10 comprises a microprobe tip 27 and is inactive in the first mode of operation.

Computer system 900 controls the computer-controlled spatial light modulator 70, on the basis of the determined position information, to (subsequently) expose at least part of one or more areas of investigation 28. In particular, computer system may control spatial light modulator 70 to subsequently adopt different states in order to expose respective different areas of investigation 28 on the sample. Herein, shortly after an area of investigation has been exposed to excitation light, such as a geometrically shaped optical excitation beam pulse 4b, a terahertz probe pulse 24 is incident on sample 2 that may be perturbed by the excitations and the resulting terahertz response may be subsequently measured by the terahertz sensor 13. Each measured far-field response is received by the computer system 900.

FIG. 11B shows an embodiment of the system in a second mode of operation. In the depicted situation the computer system 900 has moved the probe 10 to a position of area of investigation 28 (as shown in FIG. 2A) on the basis of the position information. In this position, the terahertz probe is in close proximity of a first area of interest in the area of investigation 28. Hence, the probe can measure a near-field response of the first area of interest. In this position the probe may be at a height of 0.1-10 micrometres from the first area of interest. The probe may also comprise a microprobe tip.

It should be understood that a near-field response in an area of interest may be associated with excitations in the area of interest. These excitations may be created by excitation light. The area of interest may be exposed to excitation light.

The terahertz probe may be configured to measure a near-field terahertz response upon reception of an optical probe beam 3f. The terahertz sensor system may comprise an optical system, e.g. comprising one or more optical splitters, that is configured to form at least two laser pulses on the basis of one laser pulse. It should be understood that the timing of optical probe beam may be controlled using an optical delay line, e.g. optical delay line 38 as described with reference to FIG. 1.

The terahertz probe may be configured to, when positioned in close proximity to an area of interest on the sample, measure a near-field response that is only associated with excitations in the area of interest, even if there are, at the moment of measurement, excitations present outside of the area of interest. The scan resolution of the terahertz probe may thus be determined by the characteristics of the terahertz probe and not by the size of an area that is exposed to excitation light. Hence, the computer system 900 may be configured to control the spatial light modulator 70 to expose a larger area to excitation light after moving the terahertz probe to a position for measuring a near-field response, e.g. an area comprising a plurality of areas of investigation 28 or an area that covers substantially the entire sample.

In the second mode of operation computer system 900 may be configured to move the terahertz probe to a plurality of positions on the basis of the position information, wherein in each position the terahertz probe 10 is in close proximity of another area of interest for measuring for each of these areas of interest at least one near-field response associated with excitations in each respective area of interest.

The computer system 900 may be configured to receive for each area of interest a near-field response from the terahertz probe 10.

Figures 12A, 12B:
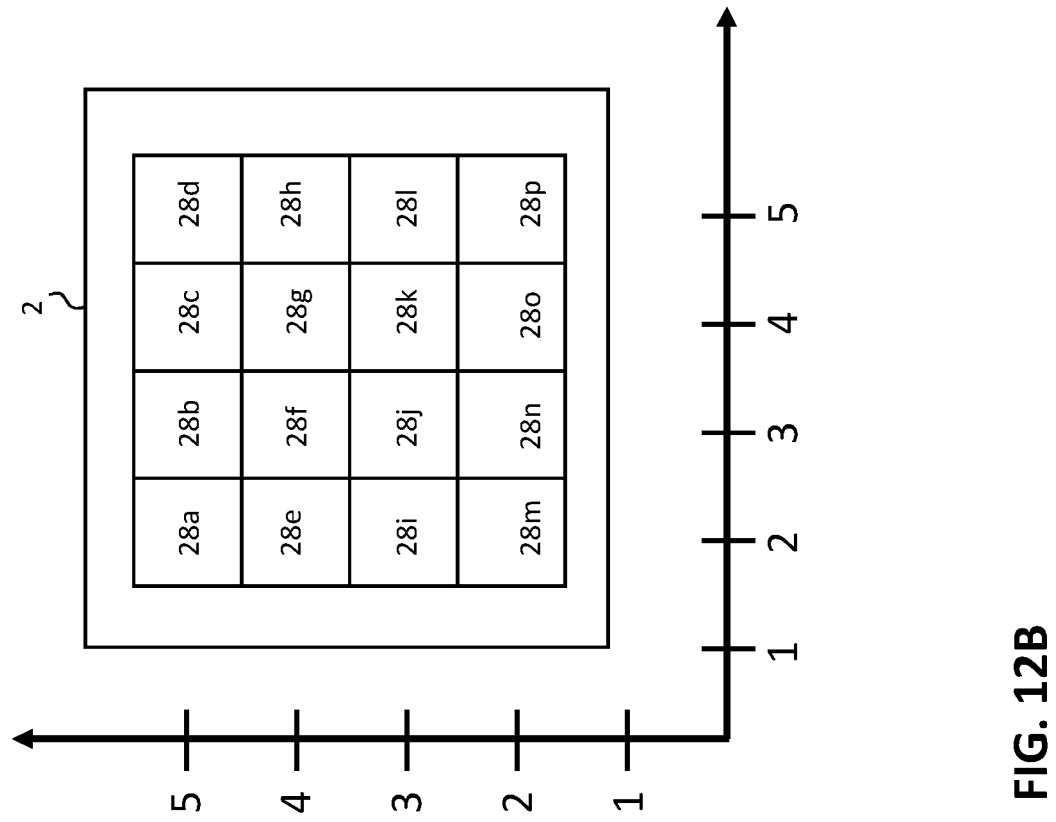
FIG. 12A and FIG. 12B depicts the use the position information by a terahertz sensor system according to an embodiment.

FIG. 12A and FIG. 12B depict the use of the position information by a terahertz sensor system according to an embodiment of the invention. In particular, FIGS. 12A and 12B illustrate how the position information, determined by the computer system 900, defines a plurality of areas of investigation 28 associated with different spatial positions on the sample 2.

FIG. 12A depicts at table defining areas of investigations and associated position information that is determined by computer system 900. As shown in FIG. 12B, the computer may divide a sample area in a grid of areas of investigation 28*a*-28*p* wherein each area is identified by an area identifier. Typically, an area of investigation may have a width between 0.1 and 10 millimetres, preferably between 0.1 and 1 millimetre. Further, each area is associated with a different spatial position on the sample (as shown in column "Position"), where the spatial position of an area of investigation may defined using a coordinate of a suitable coordinate system. A coordinate may correspond to the centre of an area of investigation. Area 28*a* for example is associated with spatial position (2;5), which defines the position of area of investigation 28*a*, in particular the position of the centre of area of investigation 28*a*. The one or more areas of investigation as defined by the position information may cover substantially the entire sample 2. Also, it should be understood that the areas of investigation 28 may have any shape, including but not limited to a round, triangular, square, or any other polygon shape.

Computer system 900 is configured to use the position information to control the spatial light modulator 70 to selectively expose at least part of the sixteen areas of investigation to excitation light. The computer system 900 may be configured to expose the areas of investigation in succession. In particular, the computer system 900 may be configured to expose a first area of investigation, e.g. area of investigation 28*a*, and only expose a second area of investigation in succession, e.g. area of investigation 28*b*, only after computer system 900 has received a far-field response for the first area of investigation 28*a*. In this manner all areas of investigation 28 may be sequentially exposed to excitation light. This way, during the sequentially scanning each area of investigation, the computer system 900 will receive for each exposure of an area of investigation a far-field response.

For each area of investigation 28*a*-28*p*, the computer system thus receives and stores at least one far-field response, of which examples are shown in FIG. 3A in column "FF response". Area 28*a*-28*k* and 28*m*-28*p* yield comparable far-field terahertz response measurements. The responses of these areas are all between 0.4 and 0.6 (in arbitrary units). For area of investigation 28*l*, however, the computer system 900 has received an aberrant far-field terahertz measurement, namely 0.1. The computer system 900 may be configured to select one area of investigation on the basis of the received far-field responses. In this example, the computer system 900 may automatically selects area 28*l*, because the measured far-field response for area 28*l* deviates from the other far-field responses or a reference far-field response. Alternatively and/or in addition, the computer system 900 may be configured to receive a user interaction that is indicative of one area of investigation. For example, the computer system may comprise a user interface for graphically showing the far field response for each area of investigation. The user interface, e.g. a touch-screen based graphical user interface, may be configured to allow user interaction for selecting a particular area of investigation, e.g. area of investigation 28*l*.

The computer system is configured to move the terahertz probe to a position within one of the areas of investigation on the basis of the position information in order so that this particular area can be examined using the high resolution near-field probe. It should be appreciated that the one area may comprise an area of investigation automatically selected by the computer system 900 and/or an area of investigation that was indicated by a received user interaction. In the depicted example, the computer system 900 is configured to move the terahertz probe to the position of area of investigation 28*l* on the basis of the coordinates (5;3) associated with area of investigation 28*l*. In this area of investigation, the terahertz probe can start measuring high-resolution near-field responses. To that end, area of interest in area of investigation 28*l*. After the computer system 900 has moved the probe in this position the sensor system may be configured to operate in the second mode of operation.

Figure 13:
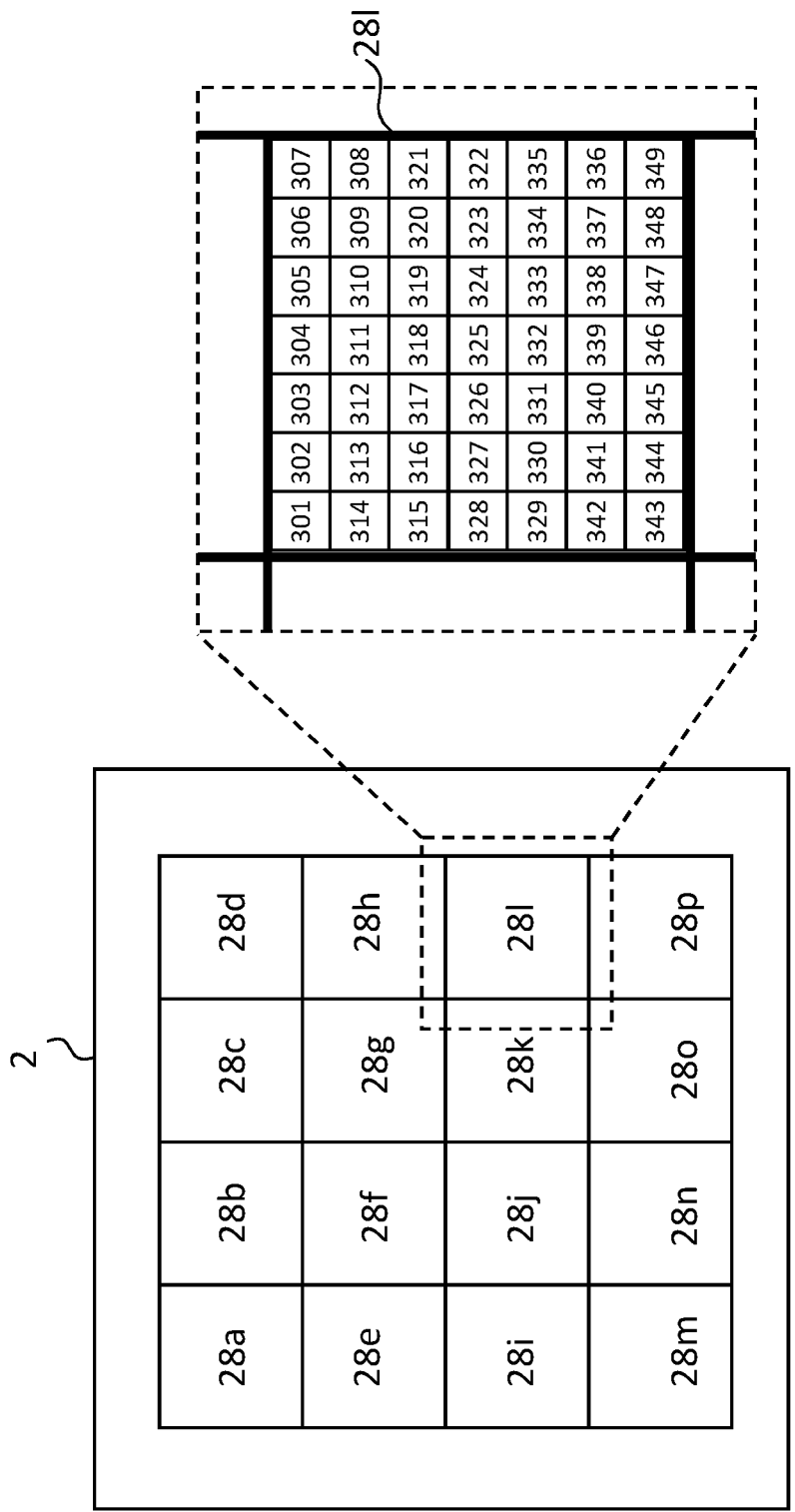
FIG. 13 depicts a relation between areas of investigation and areas of interest according to an embodiment.

FIG. 13 depicts a spatial relation between areas of investigation and areas of interest according to an embodiment. In particular, FIG. 13 shows a sample 2 comprising a grid of areas of investigation as described with reference to FIG. 12B. The computer may divide each area of investigation into a plurality of areas of interest 301-349, in this example forty-nine areas of interest. Similar to the grid of areas of investigation described with reference to FIGS. 3A and 3B, each area of interest in the grid of areas of interest may be linked to an identifier and position information, e.g. a coordinate. This way, the near-field probe 10 can be moved to a predetermined area of interest and link measure data of a the near-field response to a position on the sample.

The first area of interest, in this example area of interest 301, may be a predetermined area within the one area of investigation, in this example 28*l*. The predetermined area may for example reside in a corner, e.g. the top left corner, of the area of investigation 28*l*. In another example, the first area of interest may reside in the centre of the one area of investigation 28*l*. It should be appreciated that the computer system may be configured to determine the position of the first area of interest on the basis of position information associated with the one area of investigation. In the depicted example, the computer system 900 may be configured to determine the position of area of interest 301 on the basis of position information (5;3), which are the coordinates associated with area of investigation 28*l* (see FIG. 12A). The computer system 900 may be configured to receive a near-field response for the first area of interest.

It should be appreciated that an area of investigation may have a width between 0.1 and 10 millimetres, preferably between 0.1 and 1 millimetre. Also, the areas of interest may have a width between 0.1 and 100 micrometres.

The computer system 900 may be configured to move the terahertz probe to a further position on the basis of the position information in order to measure a second near-field response in a second area of interest in the one area of investigation. In the depicted example the computer system 900 may be configured to move the terahertz probe to a position in close proximity of area of interest 301, on the basis of at least one of a position of the first area of interest 301 and position information associated with area of interest 28l. The computer system may be configured to move the terahertz probe 10 to a further position after it has received a near-field response from the terahertz probe for the first area of interest. In an example, the computer system may be configured to move the terahertz probe over a predetermined distance in a predetermined direction relative to the position of the first area of interest.

In the depicted example, the computer system 900 moves the terahertz probe in 49 different positions in order to subsequently measure 49 near-field responses. Hence, area 28l is scanned at high resolution.

Figure 14:
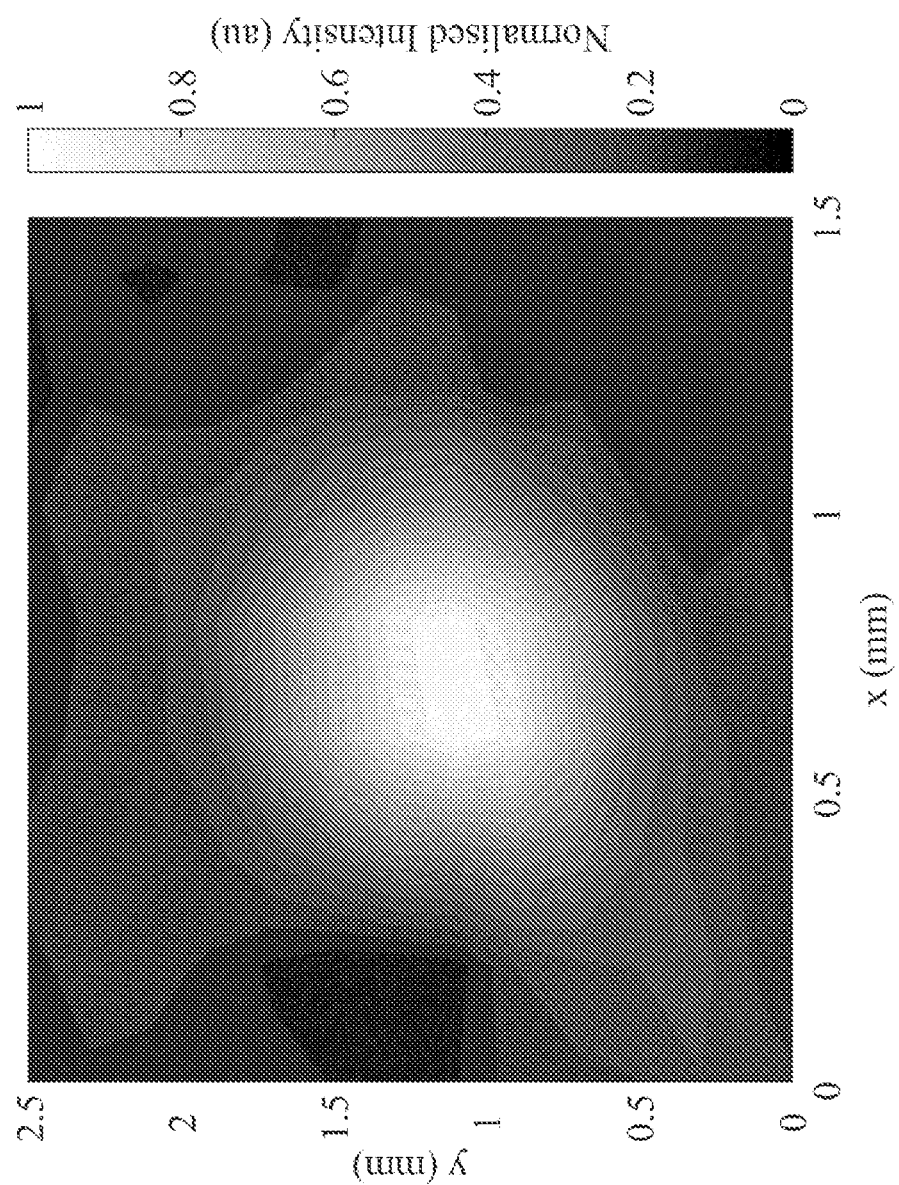
FIG. 14 shows a plot of measured far-field responses.

FIG. 14 shows a plot comprising a plurality of far-field measurements received by the computer system from the terahertz sensor for a plurality of areas of investigation. The computer system 900 may be configured to display a plot of far-field responses on the basis of the received far-field responses and on the basis of determined position information. In this example, the plurality of areas of investigation together cover an area of 1.5 mm by 2.5 mm. Each area of investigation 28 is approximately 0.2 mm by 0.2 mm. The sample that was investigated here was a GaAs sample. The bright centre of the picture corresponds to low measured THz electric fields, whereas the dark regions at the edge of the plot correspond to high measured THz electric fields. The bright regions in the electric field map of the sample can be associated with high conductivity, whereas the dark regions in the electric field map of the sample can be associated with low conductivity.

Figure 15:
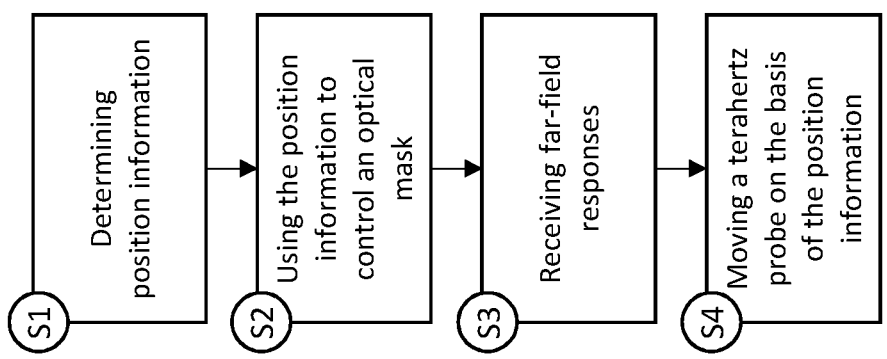
FIG. 15 schematically depict method steps according to an embodiment.

FIG. 15 schematically depicts method steps according to an embodiment of the invention. In step S1 the embodiment comprises determining position information. Herein, the position information defines areas of investigation associated with different spatial positions on a sample. The position information may comprise one or more coordinates for each area of investigation. The areas of investigation may be organized in a grid of areas, e.g. as depicted in FIG. 12B. The embodiment comprises in step S2 using the position information to control a computer-controlled spatial light modulator to selectively expose one or more areas of investigation to excitation light. The light creates excitations in the exposed area. In step S3 the embodiment comprises receiving from a far-field terahertz sensor a far-field response associated with the one or more exposed areas of investigation. For each far-field response a terahertz probe pulse may be directed at the sample. The excitations may perturb the terahertz probe pulse and the far-field terahertz sensor may measure the perturbed probe pulse. In step S4, the method comprises moving a terahertz probe on the basis of the position information to a first position in one of the one or more areas of investigation, the first position defining a first area of interest, for measuring a near-field response in the first area of interest. For the near-field response measurement a terahertz probe pulse may be directed at the sample, which may be perturbed by excitations. The perturbed probe pulse may then be measured by the near-field sensor.

Figure 16:
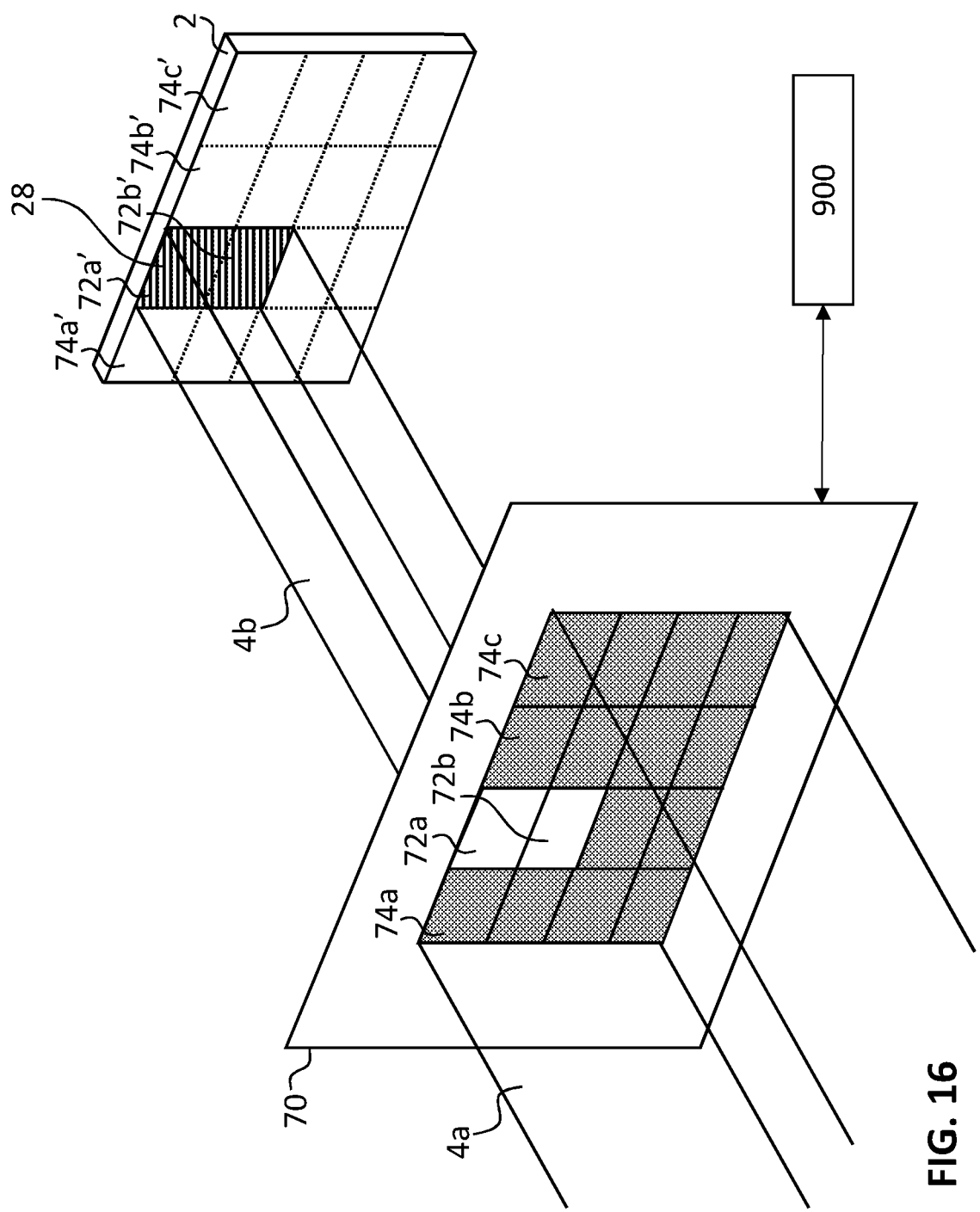
FIG. 16 schematically shows exposing an area of investigation using computer-controlled spatial light modulator according to an embodiment.

FIG. 16 schematically depicts an example of a computer-controlled spatial light modulator 70 in an embodiment of the system. Herein the computer-controlled spatial light modulator comprises a plurality of pixels 72,74, with adjustable opacity. The computer system 900 may be configured to control the opacity of the pixels 72,74. Each pixel may be associated with an area on the sample. The pixels and associated areas on the sample may possess a one-to-one correspondence. Furthermore, the computer system may be configured to control the computer-controlled spatial light modulator to expose an area of investigation by controlling the computer-controlled spatial light modulator to control a first set of one or more pixels, associated with a first set of one or more areas on the sample, to possess a low opacity and controlling a second set of one or more pixels, associated with a second set of one or more areas on the sample, to possess a high opacity, wherein the first set of one or more areas constitutes the area of investigation. This embodiment provides use of a convenient computer-controlled spatial light modulator for exposing areas of the sample to excitation light.

It should be appreciated that a low opacity of a pixel may correspond to the pixel substantially letting pass excitation light, whereas a high opacity of a pixel may correspond to the pixel substantially blocking excitation light.

In the depicted situation, the computer system 900 controls pixels 72 to maintain a low opacity and pixels 74 to maintain a high opacity. As a result, excitation light 4a that is incident on the computer-controlled spatial light modulator 70 is blocked by pixels 74. However, excitation light passes through pixels 72, yielding a geometrically shaped laser beam 4b that illuminates area of investigation 28. The spatial light modulator may be considered to expose area of investigation 28 to excitation light 4b.

In the figure, pixel 72a e.g. is associated with area 72a' on sample 2, pixel 72b with 72b', pixel 74a with area 74a' etc. As shown, areas 72a' and 72b' are exposed to the geometrically shaped optical excitation beam 4b and therefore together constitute area of investigation 28 indicated by the dashed lines.

Various types of computer-controlled spatial light modulators may be used, for example SLMs. In one embodiment, the computer-controlled spatial light modulator comprises an SLM with LCD pixels (e.g. 1920×1200 pixels), which may be configured to continuously change the light intensity that originates from a pixel from a maximum value (bright pixel) to a minimum value (dark pixel). LCD SLMs provide the advantage that they are cheap.

It should be understood that the geometrically structured laser beam 4b may be imaged by a lens system (not shown) and/or a (semi-transparent) mirror (not shown) onto sample 2. The sensor system may be configured such that the geometrically structured laser beam 4b is projected substantially normal to the surface of the semiconductor.

Figure 17:
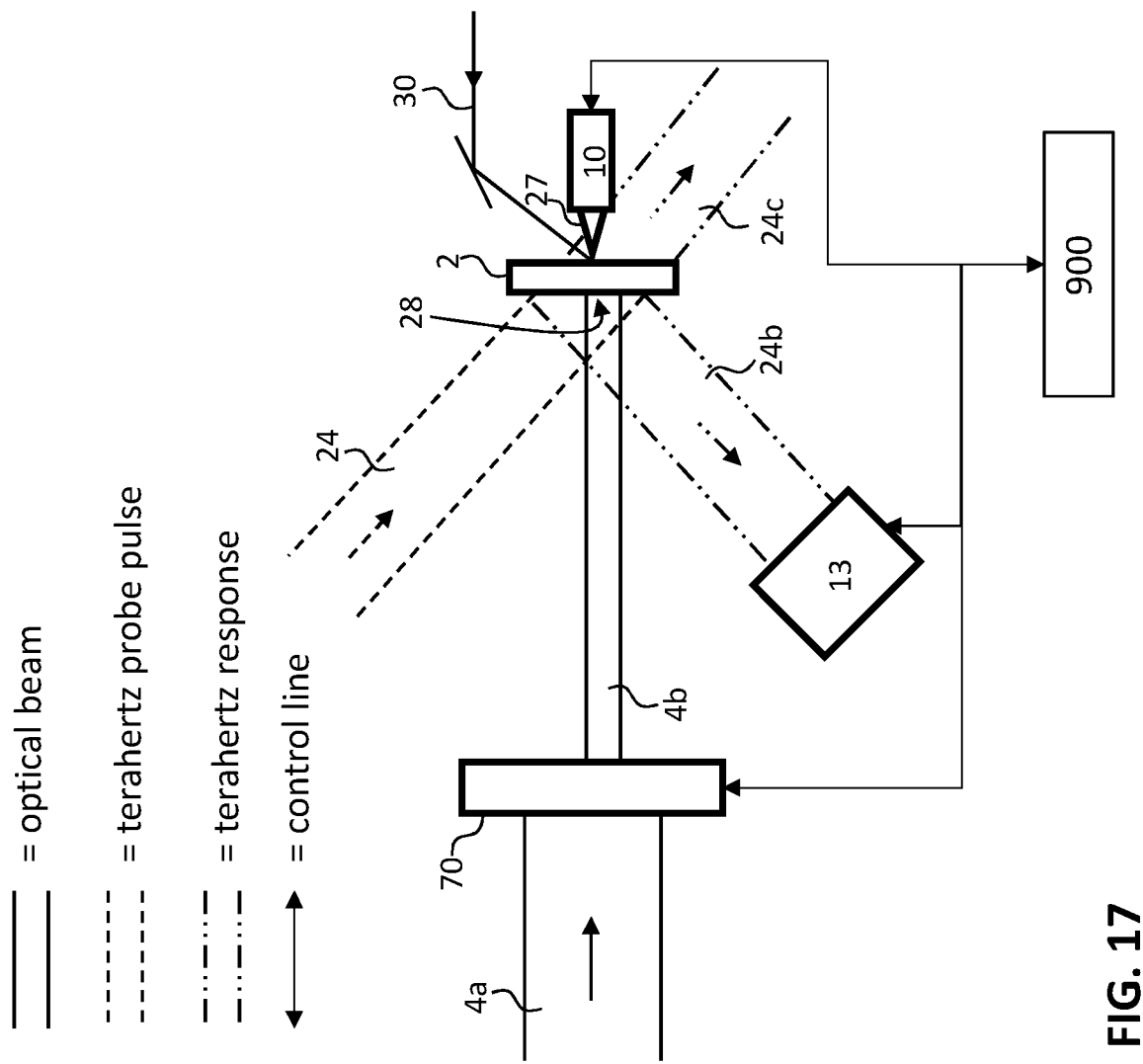
FIG. 17 at least part of a terahertz sensor system according to various embodiments.

FIG. 17 shows at least part of a terahertz sensor system according to an embodiment of the invention. In particular, FIG. 17 depicts an embodiment of the invention wherein the sensor system is configured to simultaneously perform far-field and near-field measurements on a sample. A terahertz probe pulse 25 may be partly reflected by the sample 2 and may be partly transmitted through the sample 2. The excitations created in area of investigation 28 by the excitation light may perturb the terahertz probe pulse 24 so that the reflected and transmitted components of the probe pulse can be used to derive information regarding the excitations. To that end, the reflected component 11a of the probe pulse 24 may be used to measure a far-field response with terahertz sensor 13. The transmitted component may be used to measure a near-field response with the terahertz probe 10. The computer system 900 may be configured to move the terahertz probe to a position of one of the areas of investigation, in particular to a first area of interest in the one area of investigation, prior to controlling the spatial light modulator 70 to expose the one area of investigation 28/ with excitation light 3e.

This embodiment enables in particular that a near-field response in a first area of interest in a specific area of investigation is measured simultaneously with a far-field response of the area of investigation. This embodiment also enables that terahertz sensor 13 may be mounted in a fixed position with respect to e.g. sample 2. After all, the reflected component 24b can be measured by the terahertz sensor 13 at the same location, irrespective of whether near-field responses are measured by the terahertz probe, and irrespective of which area of investigation 28 on the sample is to be investigated.

FIGS. 10, 11, 16 and 17 show that the excitation light is incident onto sample 2 at a right angle and not necessarily under an angle for which total internal reflection of the excitation light occurs. However, it is easily understood that the methods and systems described herein which make use of total internal reflection of the excitation light may be combined with the subject-matter described with reference to FIGS. 10-18.

Figure 18:
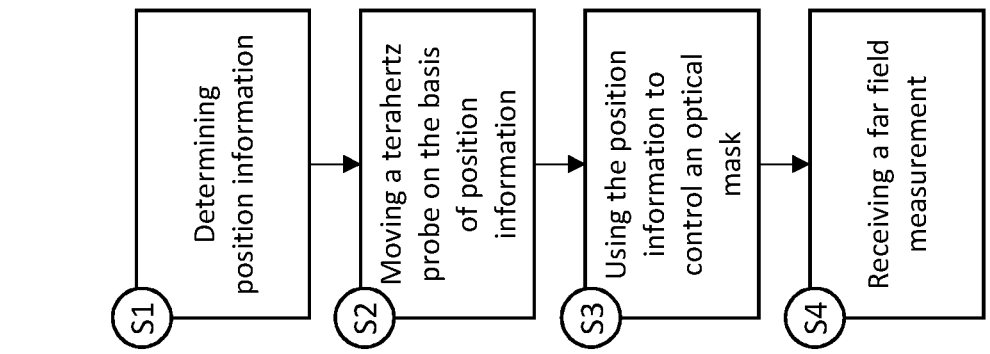
FIG. 18 depicts a terahertz sensing process according to an embodiment.

FIG. 18 depicts an embodiment of the method that may be conveniently employed in the embodiment depicted in FIG. 17. A first step S1 comprises determining position information. The position information defines an area of investigation, for example area of investigation 28 depicted in FIG. 17. A second step, S2, comprises moving a terahertz probe on the basis of this position information in order to measure a near-field response in an area of interest in the area of investigation. A third step, S3, comprises using the position information to control an spatial light modulator. A fourth step, S4, comprises receiving a far-field measurement for the one area of investigation. Note that in this embodiment of the method, the probe is moved in a position of the one area of investigation prior to receiving a far-field response for this one area of investigation. This embodiment is beneficial for simultaneously measuring a far-field response of an area of investigation and a near-field response in an area of interest in this area of investigation.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The invention is not limited to the embodiments described above, which may be varied within the scope of the accompanying claims.

The invention claimed is:

1. A method for measuring an electric field in the near-field region of an optically excited sample (2), the method comprising
    optically exciting at least part of the sample (2) comprising directing excitation light (4) onto an interface (6) between the sample (2) and a medium (8), wherein the excitation light (4) is incident onto said interface (6) under an angle of incidence such that total internal reflection of the excitation light (4) occurs at the interface (6),
    directing an electromagnetic terahertz probe pulse (24) onto the optically excited sample (2), the terahertz probe pulse (24) transmitting through and/or reflecting from the optically excited sample (2), and
    measuring said electric field using a terahertz near-field probe (10), wherein:
        the measured electric field is at least partially caused by the transmitted and/or reflected terahertz probe pulse (24), and
        the terahertz near-field probe (10) is positioned on one side of said interface (6) and the excitation light (4) approaches the interface (6) on another side of said interface (6).

2. The method according to claim 1, wherein optically exciting at least part of the sample comprises directing the excitation light (4) through the medium (8) onto said interface (6).

3. The method according to claim 1, wherein optically exciting at least part of the sample (2) comprises directing the excitation light (4) through the sample (2) onto said interface (6).

4. The method according to claim 1, wherein the terahertz near-field probe (10) comprises a photoconductive terahertz near-field probe (10), the method comprising directing an optical probe pulse (30) onto the terahertz near-field probe (10) for measuring the electric field.

5. The method according to claim 1, comprising
    directing a second electromagnetic terahertz probe pulse (24) onto the sample (2) when the sample (2) is not optically excited, the second terahertz probe pulse (24) transmitting through and/or reflecting from the sample (2),
    measuring a reference electric field caused by the second terahertz probe pulse (24) that has reflected from and/or transmitted through the sample (2).

6. The method according to claim 1, wherein directing the excitation light (4) onto said interface (6) comprises directing the excitation light (4) onto a surface (43) of an optical device (42), wherein the surface (43) is oriented at an angle with respect to said interface (6) such that at the surface (43) the excitation light (4) refracts towards said interface (6).

7. The method according to claim 6, wherein directing the electromagnetic terahertz probe pulse (24) onto the optically excited sample (2) comprises directing the terahertz probe pulse (24) onto a surface (45) of the optical device (42), which surface (45) is substantially perpendicular to the direction of propagation of the terahertz probe pulse (24).

8. The method according to claim 1, comprising
    optically exciting at least part of the sample (2) comprising directing further excitation light (4) onto the interface (6) for causing photoluminescence of the sample (2), wherein the further excitation light (4) is incident onto said interface (6) under an angle of incidence such that total internal reflection of the further excitation light (4) occurs at the interface (6), and without directing a terahertz probe pulse (24) onto the sample (2), measuring an intensity of said photoluminescence using the terahertz near-field probe (10), wherein the terahertz near-field probe (10) is positioned on one side of said interface (6) and the further excitation light (4) approaches the interface (6) on another side of said interface (6).

9. The method according to claim 1, comprising applying a first periodic signal comprising terahertz probe pulses (46) to the sample (2) comprising repeatedly directing respective terahertz probe pulses (46) onto the sample (2), wherein the first periodic signal has a first frequency, while applying a second periodic signal comprising optical excitation pulses (48) to the sample (2) comprising repeatedly directing respective optical excitation pulses (48) onto the sample (2), wherein the second periodic signal has a second frequency that differs from the first frequency, while repeatedly measuring respective values of the electric field in the near-field region of the sample (2) using the terahertz near-field probe (10), said measured values forming an output signal, and demodulating the output signal using a first reference signal having the first frequency for obtaining a first demodulated output signal; and demodulating the output signal using a second reference signal having the second frequency for obtaining a second demodulated output signal; and processing the first and second demodulated output signal for obtaining at least one of (i) a value indicative of the intensity of photoluminescence of the sample (2), (ii) a value indicative of the electric field that is caused by a terahertz probe pulse (24) that has been reflected by or transmitted through the optically excited sample (2), and (iii) a value indicative of the electric field that is caused by a terahertz probe pulse (24) that has been reflected by or transmitted through the sample (2) while not being optically excited.

10. The method according to claim 9, comprising demodulating the output signal using a third reference signal having the first or second frequency, wherein the third reference signal is phase-shifted with respect to the first or second reference signal respectively for obtaining a third demodulated output signal;

processing the first, second and third demodulated output signal for obtaining at least one of (i) a value indicative of the intensity of photoluminescence of the sample (2), (ii) a value indicative of the electric field that is caused by a terahertz probe pulse (24) that has been reflected by or transmitted through the optically excited sample (2), and (iii) a value indicative of the electric field that is caused by a terahertz probe pulse (24) that has been reflected by or transmitted through the sample (2) while not being optically excited.

11. The method according to claim 9, wherein processing the demodulated output signals comprises for each demodulated output signal, based on the first and second periodic signals applied to the sample (2), determining contributions to the demodulated output signal by photoluminescence of the sample (2), by one or more terahertz probe pulses (24) that have been reflected by or transmitted through the optically excited sample (2) and by one or more terahertz probe pulses (24) that have been reflected by or transmitted through the sample (2) that is not optically excited, and based on the demodulated output signals and based on the determined contributions, determining at least one of (i) a value indicative of the intensity of photoluminescence of the sample (2), (ii) a value indicative of the electric field that is caused by a terahertz probe pulse (24) that has been reflected by or transmitted through the optically excited sample (2), and (iii) a value indicative of the electric field that is caused by a terahertz probe pulse (24) that has been reflected by or transmitted through the sample (2) while not being optically excited.

12. A system (20) for measuring an electric field in the near-field region of an optically excited sample (2), the system (20) comprising:

an optical system for directing excitation light (4) onto an interface (6) between the sample (2) and a medium (8) under an angle of incidence such that total internal reflection of the excitation light (4) occurs, a terahertz emitter that is configured to generate a terahertz probe pulse, and a terahertz near-field probe (10) for measuring said electric field, wherein:

the measured electric field is at least partially caused by a transmitted and/or reflected terahertz probe pulse (24) being the generated terahertz probe pulse that has transmitted through and/or reflected from the optically excited sample, and the terahertz near-field probe (10) is positioned on one side of said interface (6) and the optical system is configured such that the excitation light (4) approaches the interface (6) on another side of said interface (6).

13. The system according to claim 12, wherein the optical system comprises an optical device (42) comprising a surface (43) that is oriented at an angle with respect to said interface (6) for refracting excitation light (4) that is incident on the surface towards said interface (6).

14. A non-transitory computer readable storage medium comprising at least one software code portion, the software code portion, when run on a computer system, being configured for executing the method steps of the method according to claim 1.

15. The method according to claim 1, wherein the terahertz probe pulse comprises electromagnetic radiation of frequencies between 0.1 terahertz and 20 terahertz.

16. A method for measuring an electric field in the near-field region of an optically excited sample (2), the method comprising optically exciting at least part of the sample (2) comprising directing excitation light (4) onto an interface (6) between the sample (2) and a medium (8), wherein the excitation light (4) is incident onto said interface (6) under an angle of incidence such that total internal reflection of the excitation light (4) occurs at the interface (6), and measuring said electric field using a terahertz near-field probe (10), wherein the terahertz near-field probe (10) is positioned on one side of said interface (6) and the excitation light (4) approaches the interface (6) on another side of said interface (6), and optically exciting at least part of the sample (2) comprising directing further excitation light (4) onto the interface (6) for causing photoluminescence of the sample (2), wherein the further excitation light (4) is incident onto said interface (6) under an angle of incidence such that total internal reflection of the further excitation light (4) occurs at the interface (6), and without directing a terahertz probe pulse (24) onto the sample (2), measuring an intensity of said photoluminescence using the terahertz near-field probe (10), wherein the terahertz near-field probe (10) is positioned on one side of said interface (6) and the further excitation light (4) approaches the interface (6) on another side of said interface (6).

17. A method for measuring an electric field in the near-field region of an optically excited sample (2), the method comprising optically exciting at least part of the sample (2) comprising directing excitation light (4) onto an interface (6) between the sample (2) and a medium (8), wherein the excitation light (4) is incident onto said interface (6) under an angle of incidence such that total internal reflection of the excitation light (4) occurs at the interface (6), and measuring said electric field using a terahertz near-field probe (10), wherein the terahertz near-field probe (10) is positioned on one side of said interface (6) and the excitation light (4) approaches the interface (6) on another side of said interface (6), and applying a first periodic signal comprising terahertz probe pulses (46) to the sample (2) comprising repeatedly directing respective terahertz probe pulses (46) onto the sample (2), wherein the first periodic signal has a first frequency, while applying a second periodic signal comprising optical excitation pulses (48) to the sample (2) comprising repeatedly directing respective optical excitation pulses (48) onto the sample (2), wherein the second periodic signal has a second frequency that differs from the first frequency, while repeatedly measuring respective values of the electric field in the near-field region of the sample (2) using the terahertz near-field probe (10), said measured values forming an output signal, and demodulating the output signal using a first reference signal having the first frequency for obtaining a first demodulated output signal; and demodulating the output signal using a second reference signal having the second frequency for obtaining a second demodulated output signal; and processing the first and second demodulated output signal for obtaining at least one of
- a value indicative of the intensity of photoluminescence of the sample (2), and
- a value indicative of the electric field that is caused by a terahertz probe pulse (24) that has been reflected by or transmitted through the optically excited sample (2), and
- a value indicative of the electric field that is caused by a terahertz probe pulse (24) that has been reflected by or transmitted through the sample (2) while not being optically excited.

18. The method according to claim 17, comprising demodulating the output signal using a third reference signal having the first or second frequency, wherein the third reference signal is phase-shifted with respect to the first or second reference signal respectively for obtaining a third demodulated output signal;

processing the first, second and third demodulated output signal for obtaining at least one of
- a value indicative of the intensity of photoluminescence of the sample (2), and
- a value indicative of the electric field that is caused by a terahertz probe pulse (24) that has been reflected by or transmitted through the optically excited sample (2) and, and
- a value indicative of the electric field that is caused by a terahertz probe pulse (24) that has been reflected by or transmitted through the sample (2) while not being optically excited.

19. The method according to claim 18, wherein processing the demodulated output signals comprises for each demodulated output signal, based on the first and second periodic signals applied to the sample (2), determining contributions to the demodulated output signal by photoluminescence of the sample (2), by one or more terahertz probe pulses (24) that have been reflected by or transmitted through the optically excited sample (2) and by one or more terahertz probe pulses (24) that have been reflected by or transmitted through the sample (2) that is not optically excited, and based on the demodulated output signals and based on the determined contributions, determining at least one of
- a value indicative of the intensity of photoluminescence of the sample (2), and
- a value indicative of the electric field that is caused by a terahertz probe pulse (24) that has been reflected by or transmitted through the optically excited sample (2), and
- a value indicative of the electric field that is caused by a terahertz probe pulse (24) that has been reflected by or transmitted through the sample (2) while not being optically excited.

20. The method according to claim 17, wherein processing the demodulated output signals comprises for each demodulated output signal, based on the first and second periodic signals applied to the sample (2), determining contributions to the demodulated output signal by photoluminescence of the sample (2), by one or more terahertz probe pulses (24) that have been reflected by or transmitted through the optically excited sample (2) and by one or more terahertz probe pulses (24) that have been reflected by or transmitted through the sample (2) that is not optically excited, and based on the demodulated output signals and based on the determined contributions, determining at least one of
- a value indicative of the intensity of photoluminescence of the sample (2), and
- a value indicative of the electric field that is caused by a terahertz probe pulse (24) that has been reflected by or transmitted through the optically excited sample (2), and
- a value indicative of the electric field that is caused by a terahertz probe pulse (24) that has been reflected by or transmitted through the sample (2) while not being optically excited.

* * * * *